US011826664B1

(12) United States Patent
Dote et al.

(10) Patent No.: US 11,826,664 B1
(45) Date of Patent: Nov. 28, 2023

(54) DISPENSING MECHANISM AND GAME DEVICE

(71) Applicant: MARVELOUS INC., Tokyo (JP)

(72) Inventors: Shingo Dote, Tokyo (JP); Tsutomu Narita, Tokyo (JP); Kentaro Yamaguchi, Tokyo (JP)

(73) Assignee: MARVELOUS INC., Tokyo (JP)

( * ) Notice: Subject to any disclaimer, the term of this patent is extended or adjusted under 35 U.S.C. 154(b) by 0 days.

(21) Appl. No.: 18/005,662

(22) PCT Filed: Jul. 16, 2020

(86) PCT No.: PCT/JP2020/027642
§ 371 (c)(1),
(2) Date: Jan. 16, 2023

(87) PCT Pub. No.: WO2022/014002
PCT Pub. Date: Jan. 20, 2022

(51) Int. Cl.
*A63F 13/95* (2014.01)
*A63F 9/24* (2006.01)
*A63F 13/20* (2014.01)
*A63F 13/25* (2014.01)

(52) U.S. Cl.
CPC ............... *A63F 13/95* (2014.09); *A63F 9/24* (2013.01); *A63F 13/20* (2014.09); *A63F 13/25* (2014.09); *A63F 2009/2435* (2013.01); *A63F 2009/2457* (2013.01); *A63F 2300/10* (2013.01)

(58) Field of Classification Search
CPC .. A63F 13/95; A63F 9/24; A63F 13/20; A63F 2009/2435; A63F 2009/2457; A63F 2300/10
USPC .......................................................... 463/31
See application file for complete search history.

(56) References Cited

U.S. PATENT DOCUMENTS

| 7,543,817 | B2 * | 6/2009 | Dudley | A63F 13/24 |
| | | | | 221/199 |
| 10,974,135 | B2 * | 4/2021 | Aman | A63F 13/218 |
| 11,648,465 | B1 * | 5/2023 | Aman | A63G 31/16 |
| | | | | 463/31 |
| 2008/0087681 | A1 * | 4/2008 | Dudley | B65D 81/36 |
| | | | | 221/199 |
| 2019/0143204 | A1 * | 5/2019 | Aman | A63F 13/50 |
| | | | | 463/31 |

FOREIGN PATENT DOCUMENTS

| JP | 2012157605 A | 8/2012 |
| JP | 2015093042 A | 5/2015 |
| JP | 2015221220 A | 12/2015 |
| JP | 2015226634 A | 12/2015 |

OTHER PUBLICATIONS

ISA Japan Patent Office, International Search Report Issued in Application No. PCT/JP2020/027642, dated Sep. 8, 2020, WIPO, 2 pages.

* cited by examiner

*Primary Examiner* — Pierre E Elisca
(74) *Attorney, Agent, or Firm* — McCoy Russell LLP

(57) ABSTRACT

This dispensing mechanism of the present invention is configured to dispense objects with a game. The mechanism includes: an accommodating part for accommodating the objects; a dispensing-candidate holding part for holding the objects as dispensing candidates; a pushing mechanism for pushing each of the objects accommodated in the accommodating part to the dispensing-candidate holding part; and a control part for controlling operation of the pushing mechanism.

13 Claims, 13 Drawing Sheets

DISPENSING MECHANISM AND GAME DEVICE

CROSS REFERENCE TO RELATED APPLICATION

The present application is a U.S. National Phase of International Application No. PCT/JP2020/027642 entitled "DISPENSING MECHANISM AND GAME DEVICE," and filed on Jul. 16, 2020. The entire contents of the above-listed application are hereby incorporated by reference for all purposes.

TECHNICAL FIELD

The present invention relates to a dispensing mechanism and a game device, and more particularly to a dispensing mechanism for dispensing objects in connection with a game, and a game device including the dispensing mechanism.

BACKGROUND ART

A game device that dispenses different objects according to results of a game is known (for example, Patent Document 1). The game device described in Patent Document 1 includes accommodating means for accommodating a plurality of objects, dispensing-candidate holding means for holding the objects sent from the accommodating means as dispensing candidates, identification-information reading means for reading identification information of each of the objects, and control means for determining the object to be dispensed as a dispensing target from among the dispensing candidates based on the read identification information.

In the above game device, the accommodating means and the dispensing-candidate holding means are configured as a dispensing mechanism for dispensing the objects. Further, in the game device, one control means controls the game executed by the game device while controlling the dispensing mechanism to determine a different object as the dispensing target according to results of the game. For this reason, in a case where there is a problem, for example, that the objects cannot be dispensed in the dispensing mechanism, it is necessary to repair the control means (replacement of all software, etc.) in addition to the repair of the dispensing mechanism itself. Therefore, maintenance of the dispensing mechanism could not be easily performed.

In addition, there is a desire to mount such a dispensing mechanism on another game device. Specifically, for a game device provided with a printer mechanism for printing an object, there is a desire to replace the printer mechanism with the above-mentioned dispensing mechanism. However, it has been difficult to separate the dispensing mechanism from the game device and apply it to another game device, because the control means of the game device has controlled the dispensing mechanism. Therefore, there is a need for a dispensing mechanism that solves such problems.

RELATED ART DOCUMENT

Patent Document

Patent Document 1 is JP 2012-157605 A

SUMMARY OF THE INVENTION

Problems to be Solved by the Invention

An object of the present invention is to provide a dispensing mechanism that can be easily maintained and has versatility, and provide a game device including such a dispensing mechanism.

Means for Solving the Problems

Such an object is achieved by the present invention of the following (1) to (14).

(1) A dispensing mechanism for dispensing objects in connection with a game, the mechanism comprising:
an accommodating part for accommodating the objects;
a dispensing-candidate holding part for holding the objects as dispensing candidates;
a pushing mechanism for pushing each of the objects accommodated in the accommodating part to the dispensing-candidate holding part; and
a control part for controlling operation of the pushing mechanism.

(2) The mechanism according to the above-mentioned invention (1) further comprising an imaging part that is provided above the dispensing-candidate holding part,
wherein the dispensing-candidate holding part has first identification information, and
wherein the imaging part is configured to read the first identification information of the dispensing-candidate holding part.

(3) The mechanism according to the above-mentioned invention (2), wherein the control part controls providing of the object from the accommodating part to the dispensing-candidate holding part based on the first identification information read by the imaging part.

(4) The mechanism according to the above-mentioned invention (2) or (3), wherein each of the objects has second identification information, and
wherein the control part determines the object to be dispensed based on the second identification information read by the imaging part.

(5) The mechanism according to any one of the above-mentioned inventions (1) to (4), wherein the control part further controls operation of the dispensing-candidate holding part, and independently controls the operation of each of the pushing mechanism and the dispensing-candidate holding part.

(6) The mechanism according to any one of the above-mentioned inventions (1) to (5), wherein the dispensing-candidate holding part is formed into an annular shape, and
wherein the pushing mechanism is provided inside the dispensing-candidate holding part.

(7) The mechanism according to any one of the above-mentioned inventions (1) to (6), wherein the pushing mechanism includes a first pushing part for pushing each of the objects accommodated in the accommodating part to the dispensing-candidate holding part, and a second pushing part for pushing each of the objects held by the dispensing-candidate holding part to the outside of the dispensing-candidate holding part.

(8) The mechanism according to the above-mentioned invention (7), wherein a portion of the second pushing part overlaps with the first pushing part.

(9) The mechanism according to the above-mentioned invention (7) or (8), wherein the first pushing part is formed into a plate shape,
wherein the second pushing part is formed into an elongated shape, and
wherein a lengthways direction of the first pushing part and a lengthways direction of the second pushing part are orthogonal to each other.

(10) The mechanism according to any one of the above-mentioned inventions (7) to (9), wherein each of the first pushing part and the second pushing part moves linearly.

(11) The mechanism according to any one of the above-mentioned inventions (7) to (10), wherein a tip portion of the second pushing part is located on the same plane as the first pushing part and is configured to dispense the object.

(12) The mechanism according to any one of the above-mentioned inventions (1) to (11), wherein the accommodating part includes a pair of accommodating parts, and wherein the pair of accommodating parts are provided inside the dispensing-candidate holding part.

(13) The mechanism according to the above-mentioned invention (12), wherein a portion of the pushing mechanism is located below at least one of the pair of accommodating parts.

(14) A game device comprising:

a displaying part for displaying a predetermined image related to a game;

a game control part for controlling progress of the game;

an operation part for receiving operation input from a user in order to proceed with the game; and the dispensing mechanism according to any one of the above-mentioned inventions (1) to (13) for dispensing objects in connection with the game based on the operation input.

Effects of the Invention

According to the present invention, it is possible to provide a dispensing mechanism that can be easily maintained and has versatility, and provide a game device including such a dispensing mechanism.

MODE FOR CARRYING OUT THIS INVENTION

In the following, prior to the description of the dispensing mechanism of the present invention, the game device of the present invention will be described in detail based on preferred embodiments shown in the accompanying drawings. For convenience of explanation, the upper side in the figure is explained as "upper", the lower side in the figure is explained as "lower", the left side in the figure is explained as "left", the right side in the figure is explained as "right", the front side of the paper is explained as "front" and the rear side of the paper is explained as "rear".

First Embodiment

Figure 1:
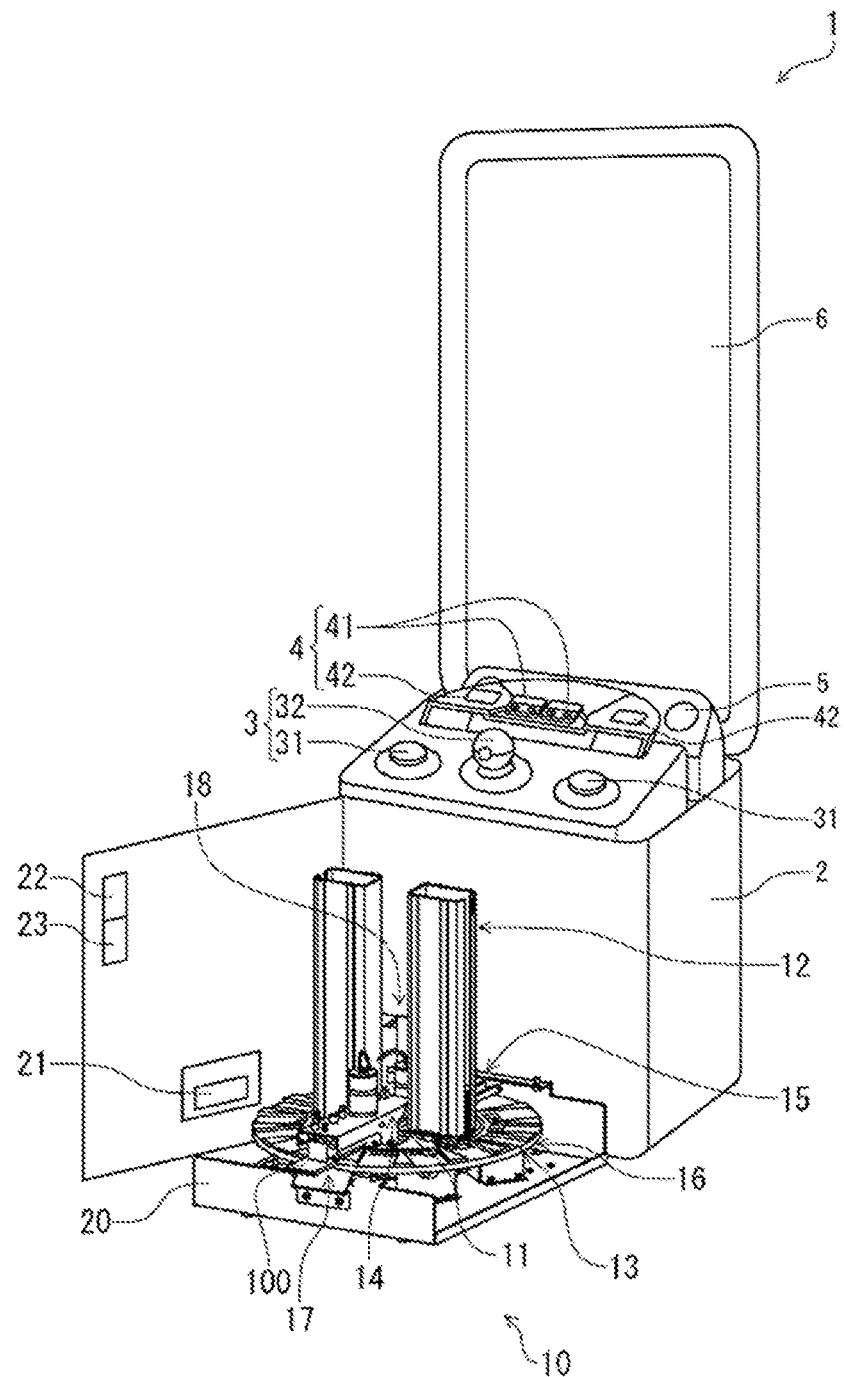
FIG. 1 is a perspective view schematically showing a configuration of a game device according to the first embodiment of the present invention.
Figure 2:
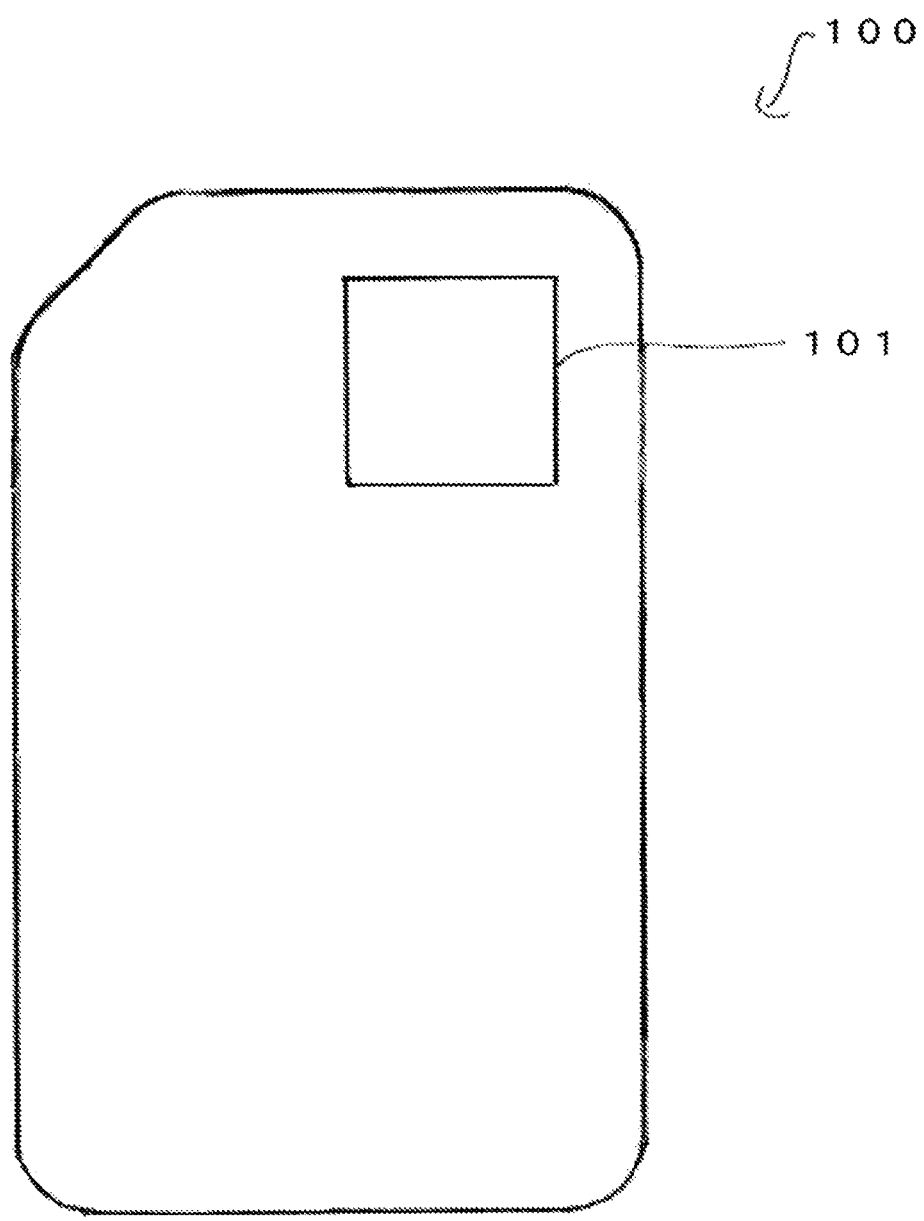
FIG. 2 is a plan view showing a recording medium used in the game device according to the first embodiment of the present invention.
Figure 3:
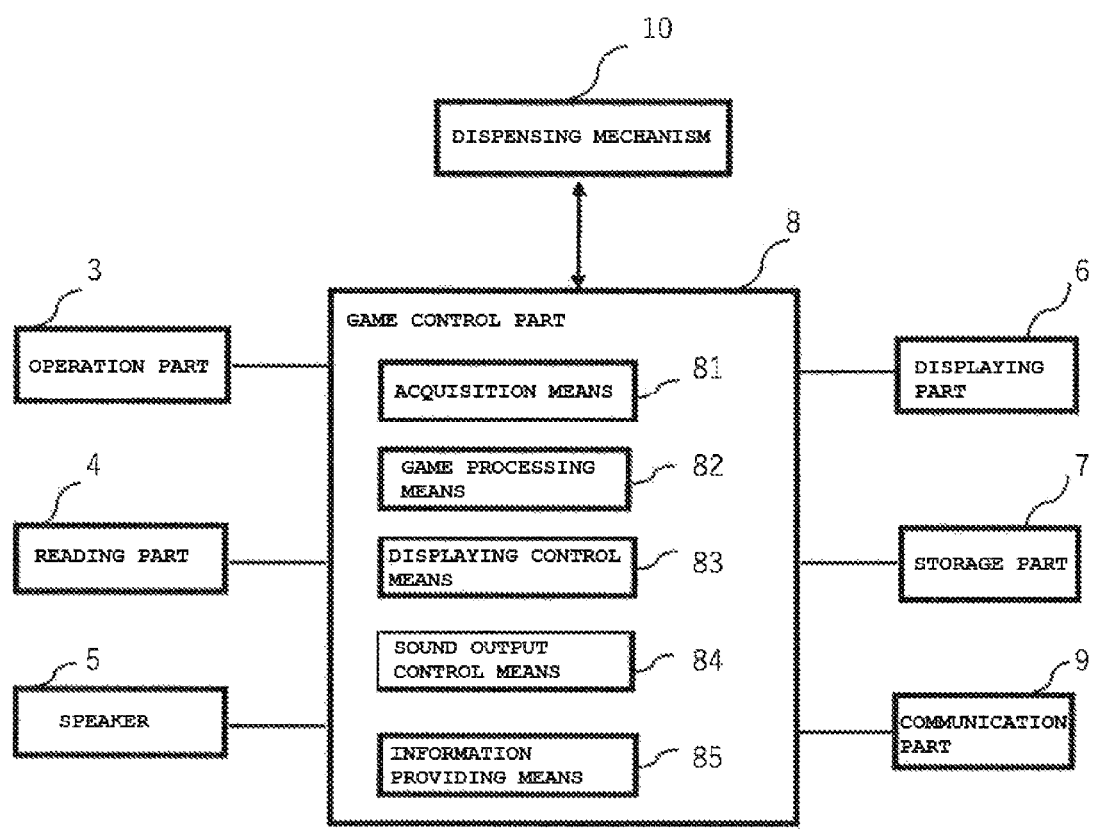
FIG. 3 is a block diagram showing a configuration of the game device according to the first embodiment of the present invention.

FIG. 1 is a perspective view schematically showing a configuration of a game device according to the first embodiment of the present invention. FIG. 2 is a plan view showing a recording medium used in the game device according to the first embodiment of the present invention. FIG. 3 is a block diagram showing a configuration of the game device according to the first embodiment of the present invention.

Game Device

As shown in FIGS. 1 and 3, the game device 1 of the present embodiment includes a housing 2, an operation part 3, a reading part 4, a speaker 5, a displaying part 6, a storage part 7, a game control part 8 and a communication part 9. In the game device 1 shown in FIG. 1, a front door of the housing 2 is open, and FIG. 1 shows a state in which a dispensing mechanism 10 to be arranged inside the housing 2 is moved forward. Prior to the explanation of each part, an outline of a game executed by the game device 1 and an object used in the game device 1 will be described.

In the game device 1, for example, a battle game can be executed by using the object (hereinafter, also referred to as "recording medium") 100 in connection with the game. The recording medium 100 is configured to store identification information such as information of character (hereinafter referred to as "character information"). The game device 1 acquires the character information recorded in the recording medium 100 by scanning the recording medium 100. After that, the game device 1 displays an image of the character on the displaying part 6. As a result, the game device 1 can execute the battle game in which the character and an opponent character are played against each other. After the game is finished, a new recording medium 100 is dispensed from the game device 1. A game executed by the game device 1 is not limited to the above-mentioned battle game, and may be a role-playing game, a board game, a simulation game, an action game or the like.

The object 100 is formed into a substantially rectangular shape, for example, as shown in FIG. 2. The object 100 has a two-dimensional code 101 on a surface thereof. The two-dimensional code 101 is configured to record identification information (second identification information) such as character information and item information. Examples of the two-dimensional code 101 include a QR code (registered trademark) and a Z code (registered trademark). The second identification information recorded in the two-dimensional code 101 may be configured to be identifiable under invisible light (infrared light), or may be configured to be identifiable under visible light. The object 100 may be configured to distinguish between a rare object (for example, an object recording a character information having a certain level or higher rarity) and a normal object (for example, an object recording a character information having a rarity below a certain level) according to the character information.

Further, the game device 1 may be configured to use an IC card in which player information is recorded or a predetermined ticket in which information for expanding a game content is recorded. Hereinafter, the configuration of each part of the game device 1 will be described.

Housing

As shown in FIG. 1, the housing 2 is formed into a substantially cuboid shape, and has a function of installing or placing each part of the game device 1. The operation part 3, the reading part 4, the speaker 5 and the displaying part 6 are installed on an upper surface of the housing 2. On the other hand, the storage part 7, the game control part 8, the communication part 9 and the dispensing mechanism 10 are placed inside the housing 2. Further, the housing 2 has a dispensing port 21 for the object 100, a coin insertion port 22 and a coin return port 23. The object 100 is dispensed from the dispensing port 21 by the dispensing mechanism 10. A container for accommodating coins, a CPU of the game device 1 and the like are accommodated inside the housing 2, but they are omitted for convenience of explanation. The shape and number of housing 2 are not particularly limited, and the number of housing 2 may be two or more. The game device 1 may have, for example, a configuration (2-in-1 configuration) in which two housings are provided adjacent to each other so as to have one displaying part and one control part.

Operation Part

The operation part 3 has a function of receiving operation input performed by a player to execute the game. The operation part 3 has two push buttons 31 and a ball-shaped lever 32. The push buttons 31 are provided on a front side of the upper surface of the housing 2 so as to be positioned symmetrically with respect to the center in the width direction of the housing 2. The player presses the push buttons 31, for example, when selecting screens displayed on the displaying part 6. In addition, the player repeatedly presses the push buttons 31 at the time of battle. The lever 32 is provided between the push buttons 31. For example, when a predetermined condition is satisfied during the game, the player operates the lever 32 so as to push down the lever 32. As a result, a specific effect is generated. The shape of the lever 32 is not particularly limited, and may be a columnar or cube shape. The position of the lever 32 is not particularly limited, and may be on the front side of the push buttons 31.

Reading Part

The reading part 4 has a function of reading the information recorded in the object 100, the IC card and the predetermined ticket. The reading part 4 has two slots 41 and two scanners 42. Further, each slot 41 is provided with an imaging device (for example, a visible light camera). Further, each scanner 42 is provided with an imaging device (for example, a visible light camera) or a reading device (for example, a non-contact card reader/writer).

The player inserts the object 100 to be used in the game into the slot 41. In this state, the imaging device takes an image of the two-dimensional code 101 of the object 100. As a result, the reading part 4 can read the identification information such as the character information recorded in the two-dimensional code 101 of the object 100. Thus, the player can select the character to be used in the battle.

The player can also place the IC card on the scanner 42 to reflect past-game results in a new game. Further, the player can place the predetermined ticket on the scanner 42 to proceed with the game, for example, in a specific play field.

Speaker

The speaker 5 has a function of outputting various sounds. In the present embodiment, two speakers 5 are provided on the upper surface of the housing 2 so as to be positioned between the operation part 3 and the displaying part 6. The sound output by each of the speakers 5 includes musical compositions, sound effects and the like stored in the storage part 7. The number of speaker 5 is not particularly limited and can be any natural number.

Displaying Part

The displaying part 6 has a function of displaying a game image (predetermined image). As shown in FIG. 1, the displaying part 6 is erected on the rear side of the upper surface of the housing 2. The displaying part 6 is composed of one displaying panel, but may be composed of two or more displaying panels. Further, the displaying panel may be a touch panel. Furthermore, the displaying part 6 is formed into a rectangular shape when viewed from the front thereof, but the shape is not limited thereto. The front view shape of the displaying part 6 may be a circular shape or a triangular shape.

Storage Part

Next, the storage part (first storage part) 7 will be described. The storage part 7 stores a game program and game data. The game program is a program for causing the game device 1 to execute a game, which is realized in cooperation with a hardware. Further, the game data is data related to a game, and includes character data, music data, image data, sound effect data, predetermined event data and the like.

The character data is data of character's names, special moves, weapons, strength, rarity, images and the like. That is, the character data corresponds to the above-mentioned character information and is the identification information for identifying characters from each other. The music data is musical composition data to be outputted from the speaker 5. The music data includes a plurality of musical composition data such as musical compositions of a singer and musical compositions of a game. The image data is data related to a predetermined image, that is, game image data. The game image data includes, for example, data of character images, background images, field images and various effect images. The sound effect data is sound data to be played during game play. The sound effect data includes, for example, evaluation sound data that is outputted according to results of operation of a player. The predetermined event data includes boss character appearance event data, bonus event data, intrusion battle event data and the like.

The storage part 7 can also store information read from the IC card and the predetermined ticket. Further, the storage part 7 can also store information provided from the dispensing mechanism 10. For example, the storage part 7 may temporarily store information of dispensing candidates determined by the dispensing mechanism 10.

Game Control Part

Next, the game control part 8 will be described. The game control part (first control part) 8 controls all the functions related to execution of the game. As shown in FIG. 3, such a game control part 8 includes acquisition means 81, game processing means 82, displaying control means 83, sound output control means 84 and information providing means 85.

Acquisition Means

The acquisition means 81 has a function of acquiring information for the operation input by the player, the character information of the object 100 and the like. The push button 31 is pressed by the player, so that the acquisition means 81 acquires the operation input information. Further, the acquisition means 81 acquires the character information or the like read by the reading part 4. Furthermore, the acquisition means 81 acquires information from a second control part 18 that controls the dispensing mechanism 10. For example, the acquisition means 81 can acquire the information of the dispensing candidates determined by the dispensing mechanism 10. The acquisition means 81 can acquire other information, for example, various information via the communication part 9.

Game Processing Means

The game processing means 82 has a function of processing the progress of the game. For example, the game processing means 82 processes the progress of the game based on the information stored in the storage part 7. Specifically, the game processing means 82 determines specific game image data from the image data stored in the storage part 7 to provide the displaying control means 83 with the specific game image data. Further, the game processing means 82 determines specific musical composition data from the music data stored in the storage part 7 to provide the sound output control means 84 with the specific musical composition data.

Furthermore, the game processing means 82 processes the progress of the game based on the information acquired by the acquisition means 81. For example, the game processing means 82 can process the progress of the game based on the information from the second control part 18 that controls the dispensing mechanism 10. Specifically, the game processing means 82 may process the progress of the game based on a type of objects 100 arranged in the dispensing-candidate holding part 13 and/or based on a type of dispensed objects 100. In this way, the game processing means 82 processes the entire progress of the game.

Displaying Control Means

The displaying control means 83 has a function of controlling the displaying of images related to the game. Namely, the displaying control means 83 controls the displaying of the game image data or the like determined by the game processing means 82.

Sound Output Control Means

The sound output control means 84 controls the output of sounds and musical compositions related to the game. Specifically, the sound output control means 84 controls the output of the musical composition data and the like determined by the game processing means 82. The sound output control means 84 provides the speaker 5 with the musical composition data and the like, so that the speaker 5 can output the sound and the musical composition.

Information Providing Means

The information providing means 85 has a function of providing the second control part 18 of the dispensing mechanism 10 with the information processed by the game processing means 82. For example, the information providing means 85 can provide the second control part 18 with the information for the object 100 to be dispensed after the game play.

Communication Part

The communication part 9 has a function of communicating with an external device via a network (LAN, WAN, Internet, etc.) by wire or wireless. Thus, the game device 1 can perform data communication with other devices such as other game devices and information terminals via the communication part 9. For example, the acquisition means 81 can acquire the music data and the game program by communicating with external devices via the communication part 9. As a result, the game program is updated, and the game device 1 can provide the latest game to the player. In this regard, the game device 1 does not have to have the communication part 9.

Dispensing Mechanism

The game device 1 is provided with the dispensing mechanism 10 that can be easily maintained and has versatility. The dispensing mechanism 10 is an example of the dispensing mechanism of the present invention. Hereinafter, the configuration of the dispensing mechanism 10 will be described in detail based on the preferred embodiments shown in the accompanying drawings.

Configuration of Dispensing Mechanism

Figure 4:
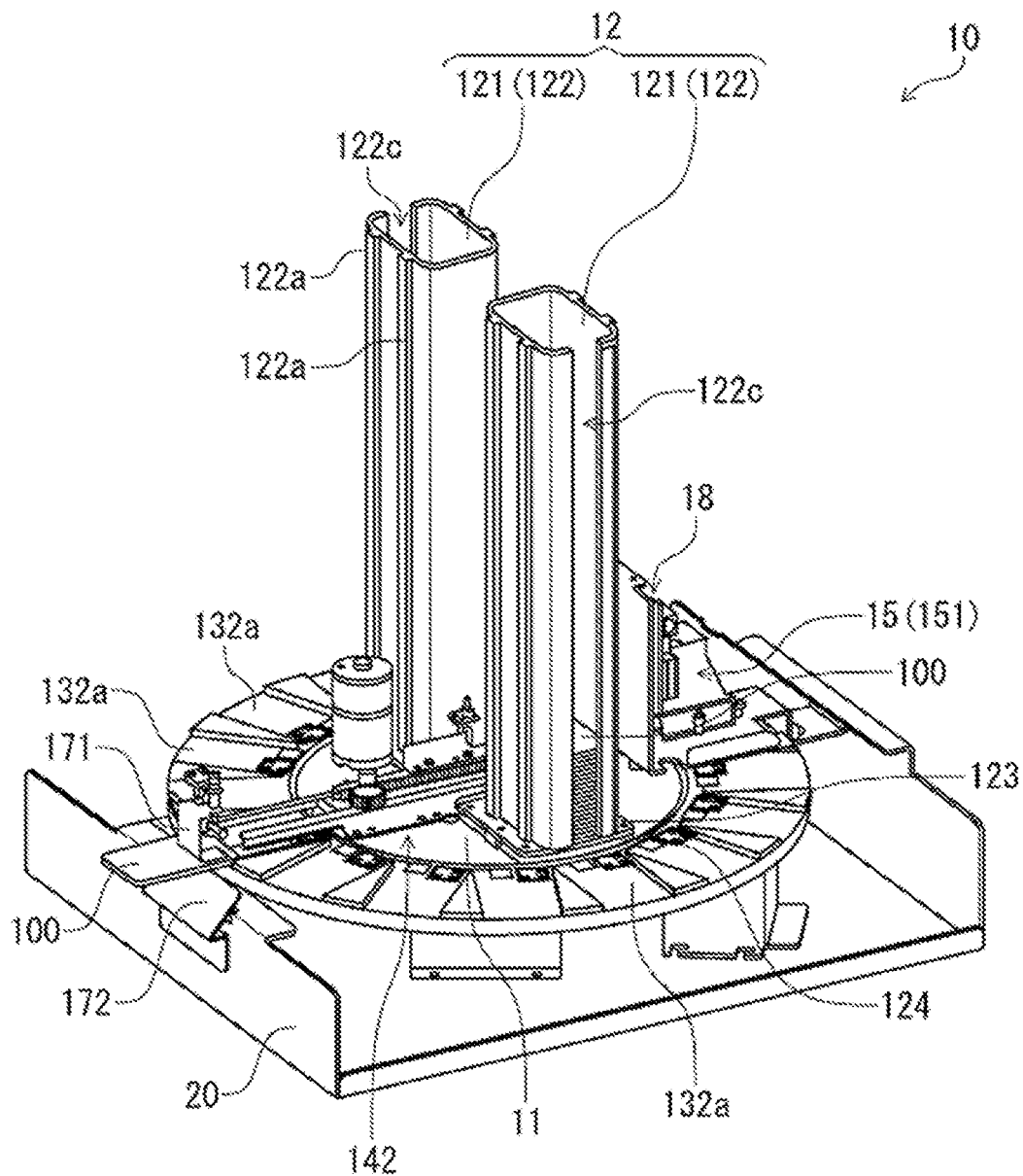
FIG. 4 is a perspective view showing a dispensing mechanism provided in the game device according to the first embodiment of the present invention.
Figure 5:
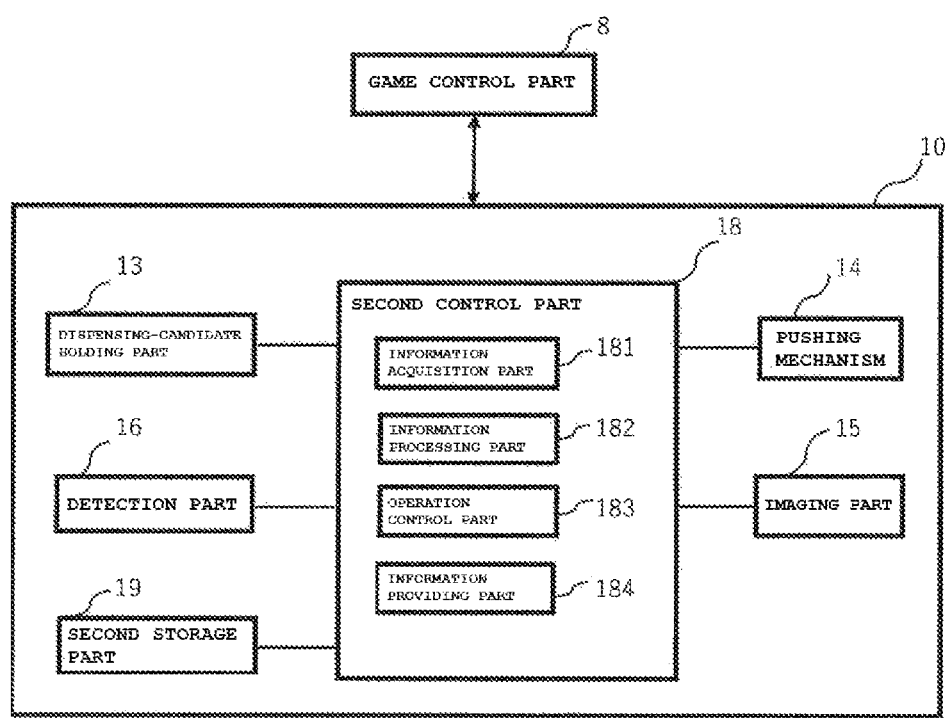
FIG. 5 is a block diagram showing a configuration of the dispensing mechanism provided in the game device according to the first embodiment of the present invention.
Figure 6:
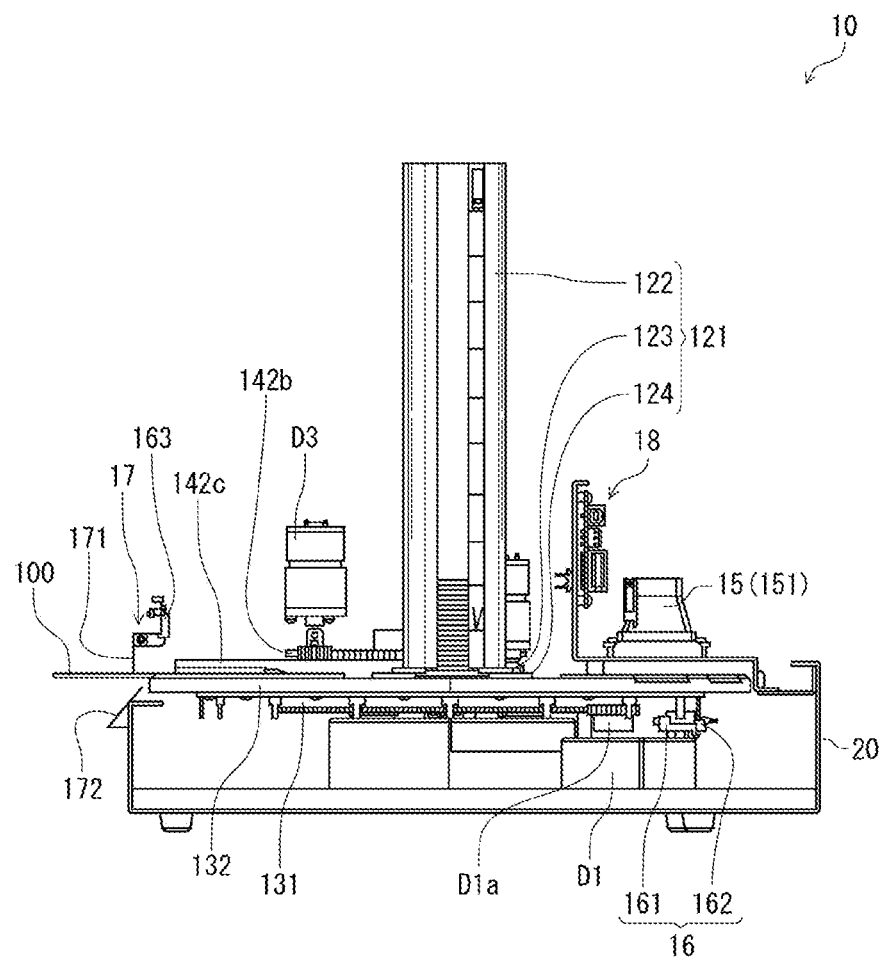
FIG. 6 is a side view showing the dispensing mechanism provided in the game device according to the first embodiment of the present invention.
Figure 7:
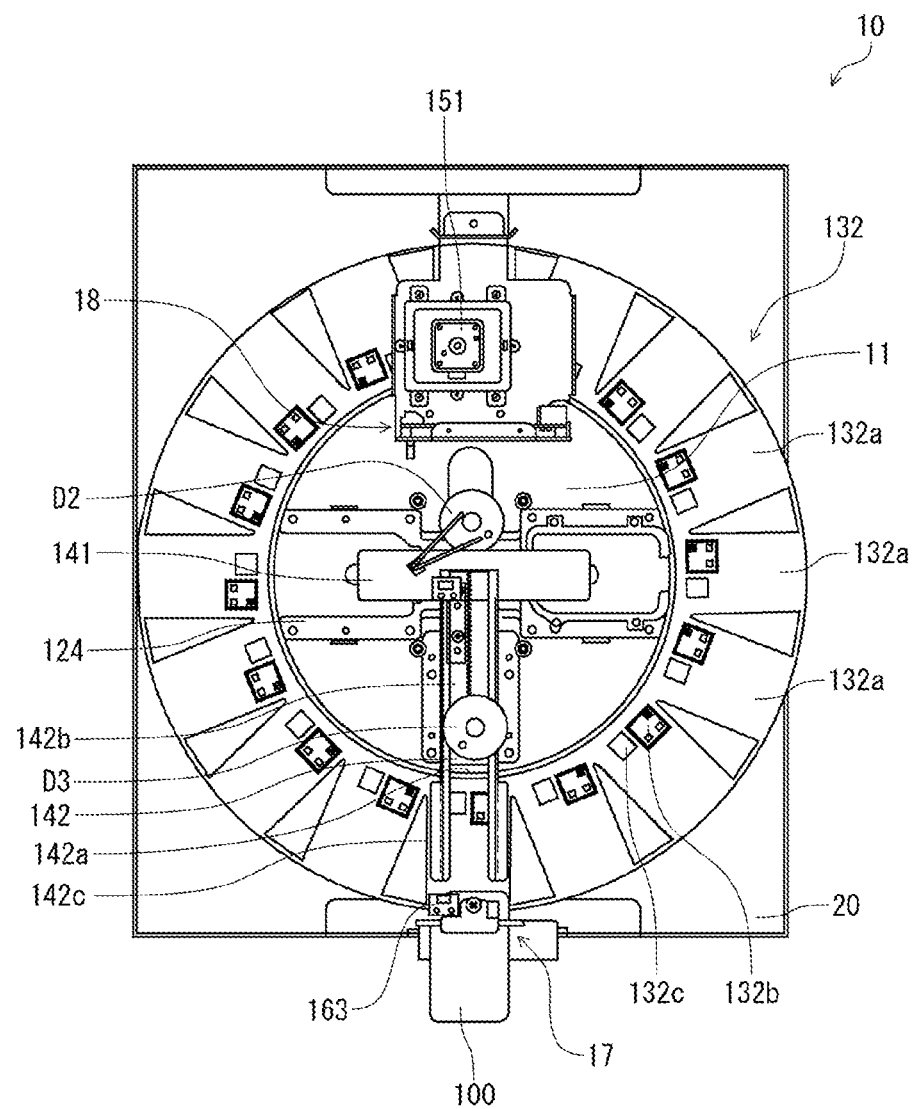
FIG. 7 is a top view showing the dispensing mechanism (excluding a portion of the accommodating part) provided in the game device according to the first embodiment of the present invention.
Figure 8:
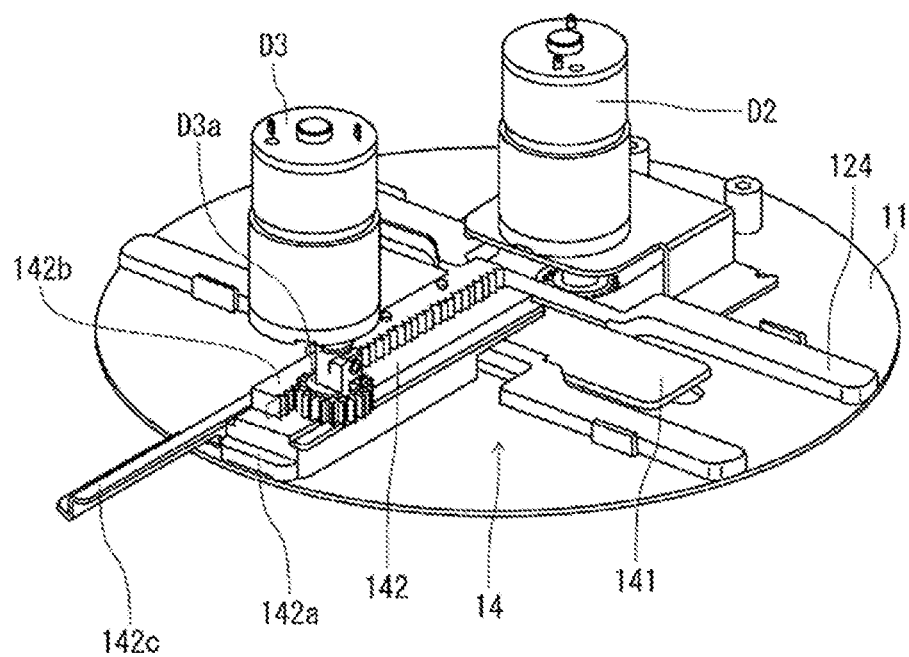
FIG. 8 is a perspective view showing a mounting part and a pushing mechanism of the dispensing mechanism provided in the game device according to the first embodiment of the present invention.
Figure 9:
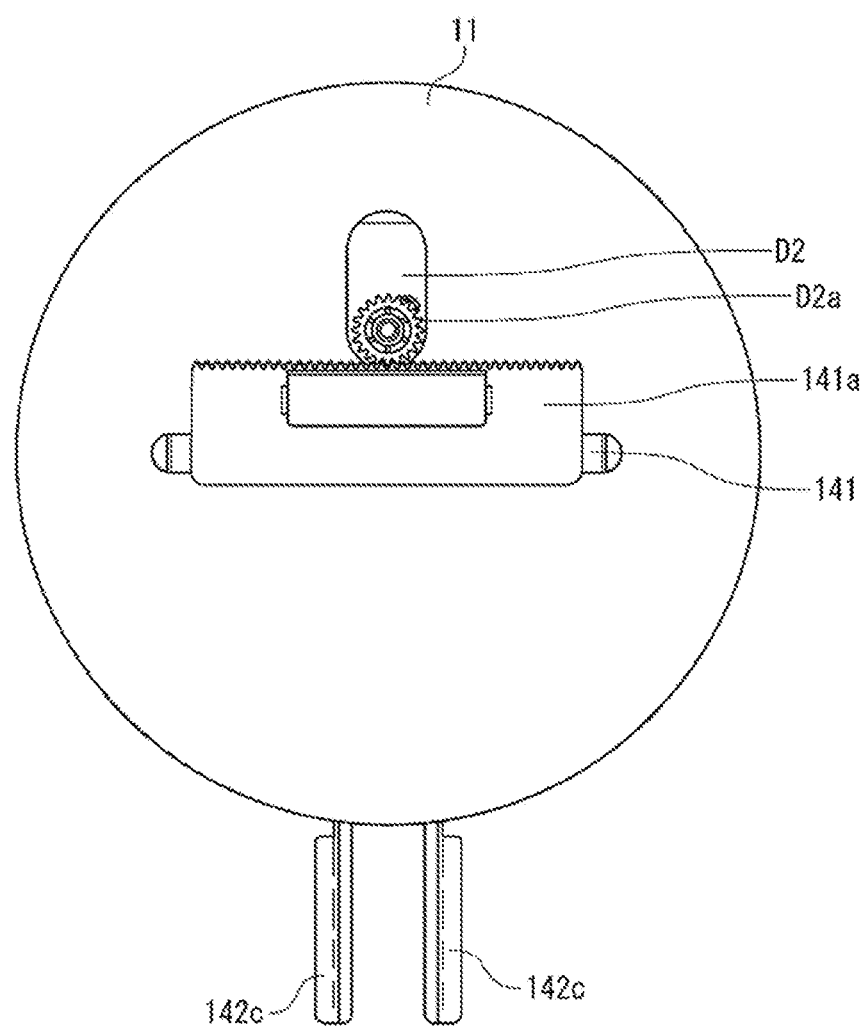
FIG. 9 is a bottom view showing the pushing mechanism of the dispensing mechanism provided in the game device according to the first embodiment of the present invention.

FIG. 4 is a perspective view showing a dispensing mechanism provided in the game device according to the first embodiment of the present invention. FIG. 5 is a block diagram showing a configuration of the dispensing mechanism provided in the game device according to the first embodiment of the present invention. FIG. 6 is a side view showing the dispensing mechanism provided in the game device according to the first embodiment of the present invention. FIG. 7 is a top view showing the dispensing mechanism (excluding a portion of the accommodating part) provided in the game device according to the first embodiment of the present invention. FIG. 8 is a perspective view showing a mounting part and a pushing mechanism of the dispensing mechanism provided in the game device according to the first embodiment of the present invention. FIG. 9 is a bottom view showing the pushing mechanism of the dispensing mechanism provided in the game device according to the first embodiment of the present invention.

As shown in FIGS. 4 and 5, the dispensing mechanism 10 includes a mounting part 11, an accommodating part 12, a dispensing-candidate holding part 13, a pushing mechanism 14, an imaging part 15, a detection part 16, a gate part 17, a second control part 18, a second storage part 19 and a pedestal part 20.

Mounting Part

The mounting part 11 is formed into a disk shape and has a function of mounting various parts on an upper surface (mounting surface) thereof. The accommodating part 12, the pushing mechanism 14, the imaging part 15 and the second control part 18 are mounted on the mounting part 11. The central portion of the mounting part 11 is cut out. Thus, a first pushing part 141 of the pushing mechanism 14 can be efficiently provided via the mounting part 11 (FIGS. 8 and 9). The mounting part 11 is provided in the center of the pedestal part 20 and is fixed to the pedestal part 20. The shape of the mounting part 11 is not particularly limited and may be a polygonal shape or the like.

Accommodating Part

The accommodating part 12 has a function of accommodating a plurality of objects 100. The accommodating part 12 includes a plurality of stockers 121 as a plurality of accommodating parts. In the present embodiment, the accommodating part 12 includes first and second stockers 121. The first and second stockers 121 are provided on the upper surface of the mounting part 11 so as to face each other. That is, the first and second stockers 121 constitute a pair of accommodating parts 12. By providing such a pair of accommodating parts 12 inside the dispensing-candidate holding part 13 described later, the dispensing mechanism 10 can have a compact configuration, and it is possible to contribute to the efficient arrangement of the objects 100 in the dispensing-candidate holding part 13.

In the present embodiment, each of the stockers 121 is fixed to the mounting part 11. The stocker 121, however, may be detachably provided on the mounting part 11, thereby easily replenishing the objects 100 to the accommodating part 12. Further, the number of stockers 121 is two in the present embodiment, but is not limited thereto. The number of stockers 121 can be any natural number. Furthermore, the number of objects 100 that can be accommodated in each stocker 121 is not particularly limited. The number of accommodated objects 100 therein may be, for example, 50. Each stocker 121 usually accommodates a set (shrink) in which the rare objects 100 and the normal objects 100 are randomly packed. Each of the stockers 121 may accommodate the objects 100 with different types. For example, various objects 100 can be accommodated in a predetermined ratio for each of the stockers 121. This makes it possible to adjust a ratio of the types of objects 100 arranged in the dispensing-candidate holding part 13. As a result, the dispensing mechanism 10 can efficiently dispense different objects 100 according to results of the game.

As shown in FIGS. 4 and 6, each stocker 121 is formed into a tower shape. The stocker 121 has a main body portion 122, an intermediate portion 123 and a foot portion 124. The main body portion 122 is formed into a tubular shape and is configured to be able to hold the plurality of objects 100. The plan view shape of the main body portion 122 is substantially rectangular so as to correspond to the shape of the object 100. Further, the main body portion 122 has a notch portion 122c on one side surface thereof. For example, portions (fingers) of the hand can be inserted into the main body portion 122 through the notch portion 122c. This makes it possible to easily put the plurality of objects 100 in the stocker 121 while supporting them by the hand.

Further, it is also possible to detect the number of objects 100 accommodated in the stocker 121 by a sensor of the detection part 16 described later via the notch portion 122c. Furthermore, for example, when the front door of the housing 2 is opened, the accommodated objects 100 can be visually observed. For this reason, there is an advantage that the game device 1 can be easily maintained. This makes it possible to avoid a state in which the stocker 121 does not contain any objects 100 at all, and thus the objects 100 can be reliably dispensed.

The main body portion 122 has four beam portions 122a on its outer peripheral surface along a longitudinal direction thereof. The beam portion 122a is formed across the entire length of the main body portion 122. Screw holes are formed into the lower end of the beam portion 122a in order to join with the foot portion 124 via the intermediate portion 123. The intermediate portion 123 functions as an intermediate material for joining the main body portion 122 to the foot portion 124. The intermediate portion 123 is formed so as to project along the plan view shape of the stocker 121 (FIG. 6). This contributes to reliably joining the main body portion 122 to the foot portion 124.

As shown in FIGS. 7 and 8, two foot portions 124 are provided on the mounting part 11. Namely, the foot portions 124 constitute a pair of foot portions 124 that are provided symmetrically via the center line of the mounting part 11 (line corresponding to the diameter of the mounting part 11 along the horizontal direction in FIG. 7) along a lengthways direction thereof. The pair of foot portions 124 are separated so that the first pushing part 141, which will be described later, can be provided therebetween. Further, the height of each of the foot portions 124 (the height from the mounting surface of the mounting part 11 to an upper surface of the foot portion 124) is about the same as the thickness of the first pushing part 141 and the thickness of the object 100, respectively. Thus, the object 100 at the bottom among the objects 100 accommodated in the stocker 121 is located between the pair of foot portions 124 and below the main body portion 122 (FIG. 6).

Dispensing-Candidate Holding Part

The dispensing-candidate holding part 13 has a function of holding the plurality of objects 100 that are the dispensing candidates sent from the accommodating part 12. In the present embodiment, the dispensing-candidate holding part 13 is configured to operate (rotate). As shown in FIGS. 6 and 7, the dispensing-candidate holding part 13 includes a support portion 131, an arrangement portion 132 and a first motor D1. The first motor D1 has a first gear D1a so as to be configured to apply power to the support portion 131 (FIG. 6).

The support portion 131 is formed into an annular shape and has a function of supporting the arrangement portion 132 and a function of receiving power from the first motor D1. A side portion (peripheral side portion) of the support portion 131 is formed into a gear shape so as to be configured to engage with the gear D1a of the first motor D1. An upper surface of the support portion 131 is covered with the arrangement portion 132.

The arrangement portion 132 has an annular shape and has a plurality (16 in the present embodiment) of holding pockets 132a. The object 100 held in each of the holding pockets 132a becomes the dispensing candidate. Therefore, as the number of holding pockets 132a increases, the number of dispensing candidates increases, thereby enhancing an effect that the dispensing mechanism 10 dispenses the objects 100 as on demand.

As shown in FIG. 7, the plurality of holding pockets 132a are provided on an upper surface of the arrangement portion 132 along a circumferential direction of the arrangement portion 132. Each holding pocket 132a has walls along the circumferential direction of the arrangement portion 132. Each wall has a triangular shape in a plan view. The height of the wall is about the same as the thickness of the object 100. Further, each holding pocket 132a does not have walls in a radial direction of the arrangement portion 132. Thus, the object 100 can be sent from the inside of the arrangement portion 132 to the holding pocket 132a, and can be dispensed from the holding pocket 132a to the outside of the arrangement portion 132.

On an upper surface of each of the holding pockets 132a, a pocket identification code 132b for confirming that the object 100 is not held and a number entry field 132c for visually distinguishing each holding pocket 132a are provided. By describing a number in each number entry field 132c, each holding pocket 132a can be visually distinguished to easily perform maintenance of the dispensing mechanism 10.

On the other hand, the pocket identification code 132b is configured to be read by the imaging part 15 described later.

The pocket identification code 132*b* is, for example, a micro QR code. The pocket identification code 132*b* records position information (pocket number information) of the holding pocket 132*a*. The information recorded in the pocket identification code 132*b* is referred to as first identification information. When the imaging part 15 reads the first identification information recorded in the pocket identification code 132*b*, the holding pocket 132*a* is in a state (vacant state) that no object 100 is held therein.

Pushing Mechanism

The pushing mechanism 14 has a function of pushing each object 100. Specifically, the pushing mechanism 14 has a function (first function) of pushing each object 100 accommodated in the accommodating part 12 to the dispensing-candidate holding part 13 and a function (second function) of pushing each object 100 held in the dispensing-candidate holding part 13 to the outside of the dispensing-candidate holding part 13. In order to exert these functions, in the present embodiment, the pushing mechanism 14 has a first pushing part (pushing part for arranging) 141 that exerts the first function and a second pushing part (pushing part for dispensing) 142 that exerts the second function. Namely, each of the first pushing part 141 and the second pushing part 142 has the single function thereof. Thus, the first pushing part 141 and the second pushing part 142 can have a simple structure. As a result, the first pushing part 141 and the second pushing part 142 are less likely to break down, thereby improving robustness of the dispensing mechanism 10.

As shown in FIGS. 7 and 8, the first pushing part 141 is formed into a plate shape, and the thickness of the first pushing part 141 is about the same as the thickness of the object 100. Thus, the first pushing part 141 can efficiently exert the function of pushing each object 100 accommodated in the accommodating part 12. Further, the first pushing part 141 is provided between the pair of accommodating parts 12, that is, between the first stocker 121 and the second stocker 121. This makes it possible to efficiently provide the first pushing part 141 on the mounting part 11, and thus the dispensing mechanism 10 can be made compact. As a result, since the dispensing mechanism 10 can be applied to various game devices, it is possible to enhance the versatility of the dispensing mechanism 10. The first pushing part 141 has a plate-shaped support plate 141*a* and a second motor D2. The second motor D2 has a second gear D2*a* so as to be configured to apply power to the support plate 141*a* (FIGS. 8 and 9).

The support plate 141*a* has a function of supporting the first pushing part 141 via the mounting part 11 and a function of receiving the power of the second motor D2. As shown in FIG. 9, one side portion of the support plate 141*a* is formed into a gear shape so as to be configured to engage with the gear D2*a* of the second motor D2. Thus, the first pushing part 141 can move linearly.

Such a first pushing part 141 is configured to push alternately each object 100 accommodated in the first stocker 121 and each object 100 accommodated in the second stocker 121 on the mounting surface of the mounting part 11. Thus, the first pushing part 141 can efficiently push each object 100.

Further, a portion of the first pushing part 141 is located below at least one of the first stocker 121 and the second stocker 121 which are the pair of accommodating parts 12. This makes it possible to efficiently place the first pushing part 141 on the mounting part 11 while sufficiently ensuring the length of the first pushing part 141. Therefore, the object 100 of various shapes and sizes can be reliably pushed, and the dispensing mechanism 10 can be made compact. As a result, the dispensing mechanism 10 can be easily applied to various game devices to further enhance the versatility of the dispensing mechanism 10.

Next, the second pushing part 142 will be described. The second pushing part 142 is formed into an elongated shape and is configured to push each object 100 held by the dispensing-candidate holding part 13 to the gate part 17. As shown in FIG. 8, a portion (end portion located on a side of the center of the mounting part 11) of the second pushing part 142 overlaps with the first pushing part 141. This makes it possible to efficiently place the first pushing part 141 and the second pushing part 142 on the mounting part 11, which contributes to making the dispensing mechanism 10 compact. As a result, the dispensing mechanism 10 can be applied to various game devices to improve the versatility of the dispensing mechanism 10. The second pushing part 142 has a contact portion 142*a*, a receiving portion 142*b*, a rail portion 142*c* and a third motor D3. The third motor D3 has a third gear D3*a* so as to be configured to apply power to the receiving portion 142*b* (FIG. 8).

The contact portion 142*a* is formed so as to constitute a tip portion of the second pushing part 142. The thickness of the contact portion 142*a* is about the same as the thickness of the object 100. Thus, the contact portion 142*a* can surely make a contact with the object 100.

The receiving portion 142*b* is formed into an elongated shape and is provided on an upper portion of the second pushing part 142. Further, a side portion of the receiving portion 142*b* is formed into a gear shape so as to be configured to engage with the gear D3*a* of the third motor D3. This receiving portion 142*b* projects so as to overlap with the first pushing part 141. This makes it possible to secure a sufficient length of the receiving portion 142*b* while suppressing the size of the second pushing part 142. As a result, it is possible to widen the range of motion of the second pushing part 142. Further, it is possible to contribute to making the dispensing mechanism 10 compact. Furthermore, it is possible to reliably push each object 100 of various shapes and sizes.

The rail portion 142*c* is composed of a pair of rail members. The pair of rail members are provided on the mounting part 11 so as to fit in the width of the holding pocket 132*a* by being apart from each other. For convenience of explanation, a portion of the pushing mechanism 14 (portion of the rail member and the like) is omitted in FIG. 8. One end portion (end portion located on the arrangement portion 132 side) of the rail portion 142*c* projects across from the mounting part 11 to the arrangement portion 132. Thus, the second pushing part 142 can move (linearly move) so as to overlap the holding pocket 132*a* to reliably push each object 100 held in the holding pocket 132*a*.

Further, the other end portion (end portion located on a side of the center of the mounting part 11) of the rail portion 142*c* projects above the first pushing part 141. As a result, a portion of the second pushing part 142 can move (linearly move) until it overlaps with the first pushing part 141.

As described above, the second pushing part 142 is configured to move linearly across from the mounting part 11 to the dispensing-candidate holding part 13. Thus, the second pushing part 142 can efficiently dispense each object 100.

Further, the second pushing part 142 is located along the center line of the mounting part 11 (line corresponding to the diameter of the mounting part 11 along the vertical direction in FIG. 7) between the pair of accommodating parts 12 so as to be orthogonal to the lengthways direction of the first pushing part 141. Namely, in the plan view of the dispensing mechanism 10, the lengthways direction of the first pushing part 141 and the lengthways direction of the second pushing part 142 are orthogonal to each other. Thus, the dispensing mechanism 10 can be made into a compact configuration. As a result, the dispensing mechanism 10 can be applied to various game devices to enhance the versatility of the dispensing mechanism 10.

Furthermore, the contact portion (tip portion) 142a of the second pushing part 142 is located on the same plane as the first pushing part 141 (on the mounting surface) so as to dispense each object 100. Such a configuration allows the first pushing part 141 and the second pushing part 142 to efficiently act on the dispensing-candidate holding part 13. As a result, the object 100 can be efficiently dispensed.

The pushing mechanism 14 described above is configured to send each object 100 from the accommodating part 12 to the dispensing-candidate holding part 13 and further from the dispensing-candidate holding part 13 to the gate part 17. Thus, the configuration of the pushing mechanism 14 is not particularly limited as long as being able to exhibit the function of sending the object 100 between the parts. Namely, the pushing mechanism 14 may have a configuration that functions as a sending part for sending the object 100 to each part.

Imaging Part

The imaging part 15 has a function of reading the pocket identification code 132b provided in the holding pocket 132a and the second identification information recorded in the two-dimensional code 101 of the object 100 held in the holding pocket 132a. Namely, the imaging part 15 functions as an identification-information reading part. As shown in FIG. 6, the imaging part 15 has a camera 151 provided above the arrangement part 132. The type of camera 151 is not particularly limited, and examples thereof include a visible light camera, an infrared camera and a full spectrum camera. In the present embodiment, the camera 151 is composed of the visible light camera. Since the dispensing-candidate holding part 13 rotates below the camera 151, the camera 151 can take images of the pocket identification code 132b of each holding pocket 132a and the two-dimensional code 101 of the object 100 held in each holding pocket 132a to read the information recorded in them.

Detection Part

The detection part 16 has a function of detecting or sensing a state of the dispensing mechanism 10 (for example, position information of each part, information for the number of objects 100 stored in each stocker 121, etc.). For example, the detection part 16 can detect the position information (pocket number information) of each holding pocket 132a provided in the dispensing-candidate holding part 13. In order to detect the position information, in the present embodiment, the detection part 16 has a first sensor 161 and a second sensor 162.

Specifically, the detection part 16 includes the first sensor (index sensor) 161 for detecting a reference holding pocket 132a among the holding pockets 132a and the second sensor 162 for detecting the position information of each holding pocket 132a in order from the reference holding pocket 132a. The first sensor 161 and the second sensor 162 are arranged so as to detect the position information of each holding pocket 132a from below each holding pocket 132a (FIG. 6).

Further, as shown in FIG. 6, the detection part 16 has a third sensor 163 provided adjacent to the gate part 17, which will be described later. The third sensor 163 has a function of detecting the object 100 passing through the gate part 17. Thereby, the detection part 16 can detect whether or not the object 100 has been dispensed through the gate part 17. Namely, the detection part 16 can also detect dispensing abnormality information of the object 100. In this case, an information acquisition part 181 may acquire the dispensing abnormality information. Further, an information providing part 184 may provide the dispensing abnormality information to the game control part 8 so that the game processing means 82 can temporarily stop the game.

The detection part 16 may also have a fourth sensor for detecting the number of objects 100 accommodated in the stocker 121. The fourth sensor may be configured to detect the number of objects 100 via the notch portion 122c of the main body portion 122 of the stocker 121. Such a fourth sensor can detect whether the number of objects 100 accommodated in the stocker 121 is a predetermined number or more or the predetermined number or less. This facilitates the replenishment (replacement) of the objects 100. The installation position and number of such a fourth sensor may be adjusted depending on the configuration of the accommodating part 12 (for example, depending on the position of the notch portion 122c).

Each sensor may be any sensor such as a reflective photoelectric sensor, a transmissive photoelectric sensor, a magnetic sensor, an infrared sensor, a proximity sensor and a mechanical contact sensor. The type, number, and installation position of each sensor are not particularly limited as long as the function can be exhibited.

Gate Part

The gate part 17 has a function as an outlet of the dispensing mechanism 10 to guide the object 100 pushed from the holding pocket 132a to the dispensing port 21. The number of gate part 17 is appropriately selected according to the configuration of the game device 1. In the present embodiment, one gate portion 17 is provided adjacent to the dispensing-candidate holding part 13 so as to correspond to the front surface of the game device 1. The gate part 17 has a flap 171 and a dispensing path 172.

The flap 171 is configured to be movable by making a contact with the object 100 pushed from the dispensing-candidate holding part 13. The third sensor 163 can detect the movement of the flap 171. Thus, the detection part 16 can detect that the object 100 has been dispensed through the gate part 17.

The dispensing path 172 has a function of guiding the object 100 that has passed through the flap 171 to the dispensing port 21. The configuration of the dispensing path 172 is not particularly limited as long as it has the function. In the present embodiment, the dispensing path 172 is configured to have an inclined surface. Thus, the object 100 slides down to the dispensing port 21 due to its own weight through the inclined surface thereof, and then the object 100 is dispensed.

Second Control Part

The second control part 18 has a function of controlling the processing related to the dispensing mechanism 10 independently of the game control part 8. The second control part 18 includes an information acquisition part 181, an information processing part 182, an operation control part 183 and an information providing part 184.

The information acquisition part 181 has a function of acquiring various kinds of information in relation to the dispensing mechanism 10. For example, the information acquisition part 181 can acquire the position information of each holding pocket 132a detected by the detection part 16. Further, the information acquisition part 181 can acquire the first identification information recorded in the pocket identification code 132*b* of each holding pocket 132*a* read by the imaging part 15. Furthermore, the information acquisition part 181 can acquire the second identification information of the object 100 held in each holding pocket 132*a* read by the imaging part 15. Moreover, the information acquisition part 181 can acquire the information provided by the information providing means 85.

The information processing part 182 has a function of processing the information acquired by the information acquisition part 181. For example, the information processing part 182 determines the objects to be the dispensing candidates (objects to be dispensed) 100 based on the second identification information of the object 100 held in each holding pocket 132*a*. Thus, among the objects 100 held in the dispensing-candidate holding part 13, the object 100 having the highest rarity can be included in the dispensing candidates. Namely, the information processing part 182 can adjust the dispensing candidates to enhance the interesting of the game device 1. Further, the information processing part 182 may determine the objects 100 to be the dispensing candidates according to the player information (character information associated with the player, etc.). Furthermore, the information processing part 182 can confirm the type of dispensed object 100 based on the type of object 100 held in each holding pocket 132*a* acquired by the information acquisition part 181. Moreover, the information processing part 182 can confirm the number of objects 100 held in the dispensing-candidate holding part 13.

The operation control part 183 has a function of controlling the operation of each part of the dispensing mechanism 10. For example, the operation control part 183 can independently control the operation of each of the dispensing-candidate holding part 13 and the pushing mechanism 14 based on the information acquired by the information acquisition part 181. This makes it possible to smoothly arrange the objects 100 in the dispensing-candidate holding part 13 from the accommodating part 12 and to smoothly dispense each object 100 from the dispensing-candidate holding part 13. The operation control part 183 can control the dispensing-candidate holding part 13 so as to rotate clockwise or counterclockwise. Further, the operation control part 183 may freely change these rotation speeds. In this way, the operation control part 183 can control the motion of each part of the dispensing mechanism 10.

The information providing part 184 has a function of providing the game control part 8 of the game device 1 with the information related to the dispensing mechanism 10. For example, the information providing part 184 can provide the game control part 8 with the information of the objects 100 to be the dispensing candidates determined by the information processing part 182.

As described above, the dispensing mechanism 10 includes the second control part 18 capable of controlling the processing related to the objects 100 of the dispensing mechanism 10 independently of the game control part 8. Thus, the dispensing mechanism 10 can be separated from the game device 1 and mounted on a conventional game device (for example, a game device including a printer mechanism) instead of the printer mechanism. Therefore, the dispensing mechanism 10 has high versatility. Further, since the dispensing mechanism 10 has the second control part 18, even if there is a problem for example that the object 100 cannot be dispensed, the repairing may be performed on not the game control part 8, but the second control part 18 as needed. Therefore, maintenance of the dispensing mechanism 10 can be easily performed. Furthermore, it is possible to easily repair the dispensing mechanism 10 while the game control part 8 proceeds with the game.

Second Storage Part

The dispensing mechanism 10 includes the second storage part 19 independently of the storage part 7 of the game device 1. The second storage part 19 has a function of storing the information related to the dispensing mechanism 10. For example, the second storage part 19 can store the position information of each part detected by the detection part 16. Further, since the mounting part 11 is immovable, the second storage part 19 may store in advance the position information of the first stocker 121, the second stocker 121, the second pushing part 142 and the imaging part 15 provided on the mounting part 11. Namely, the second storage part 19 may store information that the imaging part 15 is provided on the upper side (12 o'clock position), the second stocker 121 is provided on the right side (3 o'clock position), the second pushing part 142 is provided on the lower side (6 o'clock position) and the first stocker 121 is provided on the left side (9 o'clock position) in FIG. 7.

In the present embodiment, since the accommodating part 12 has the plurality of stockers 121, the second storage part 19 may store information related to the plurality of stockers 121 (hereinafter, referred to as "stocker information"). Examples of the stocker information include information for the type of objects 100 accommodated in the stocker 121, information for the number of objects 100 accommodated in the stocker 121 and the like. The information stored in the second storage part 19 may also be stored in the storage part 7.

Pedestal Part

The pedestal part 20 has a function of supporting each part. In the present embodiment, the pedestal part 20 supports the mounting part 11, the accommodating part 12, the dispensing-candidate holding part 13, the pushing mechanism 14, the imaging part 15, the detection part 16, the gate part 17, the second control part 18 and the second storage part 19. Further, the pedestal part 20 may have a function of accommodating the storage part 7 and the like of the game device 1. The pedestal part 20 may have any shape and configuration as long as it can exhibit such a function.

Operation Method for the Dispensing Mechanism

Figure 10:
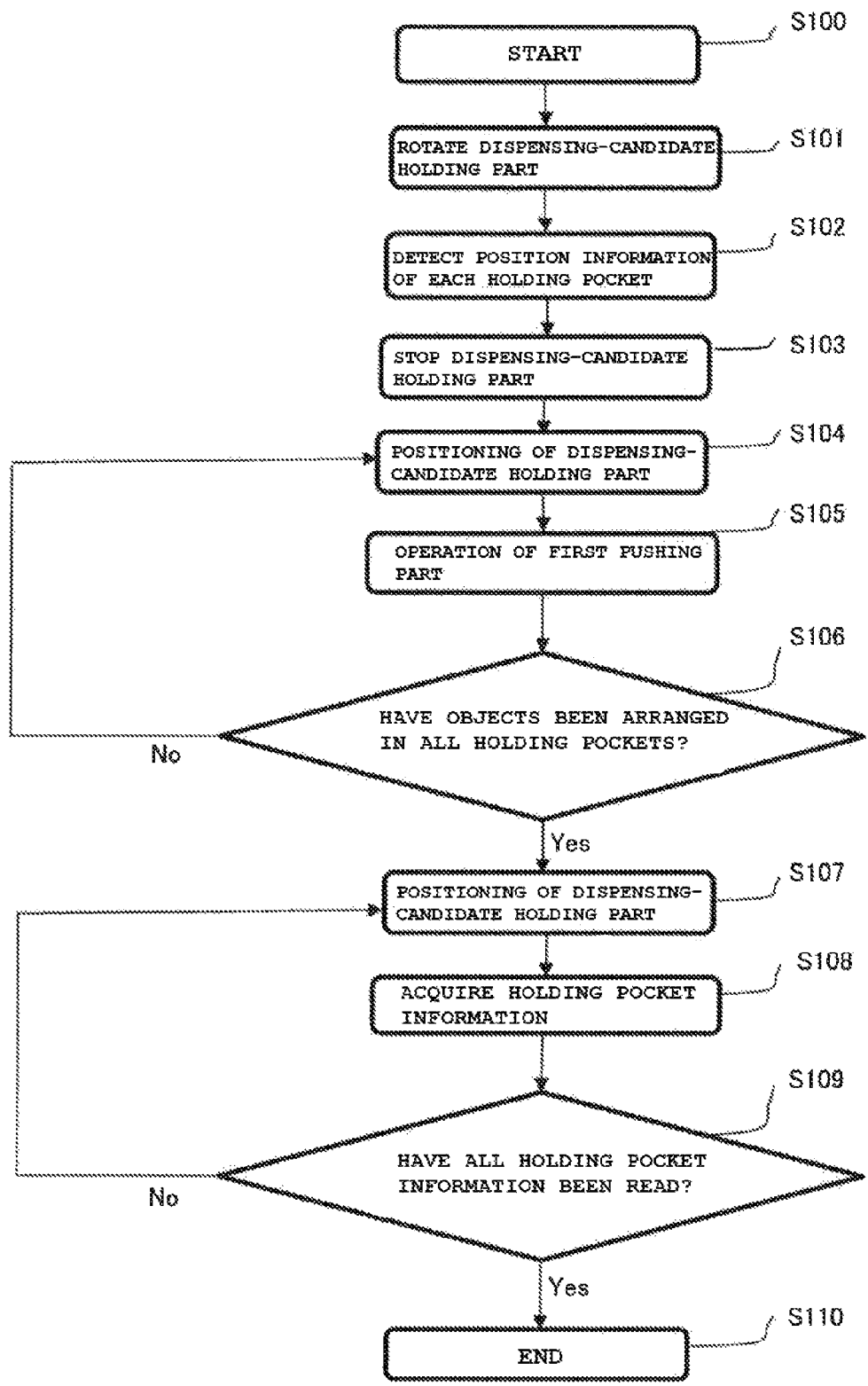
FIG. 10 is a flowchart showing an example of a method for dispensing objects in the dispensing mechanism provided in the game device according to the first embodiment of the present invention.
Figure 11:
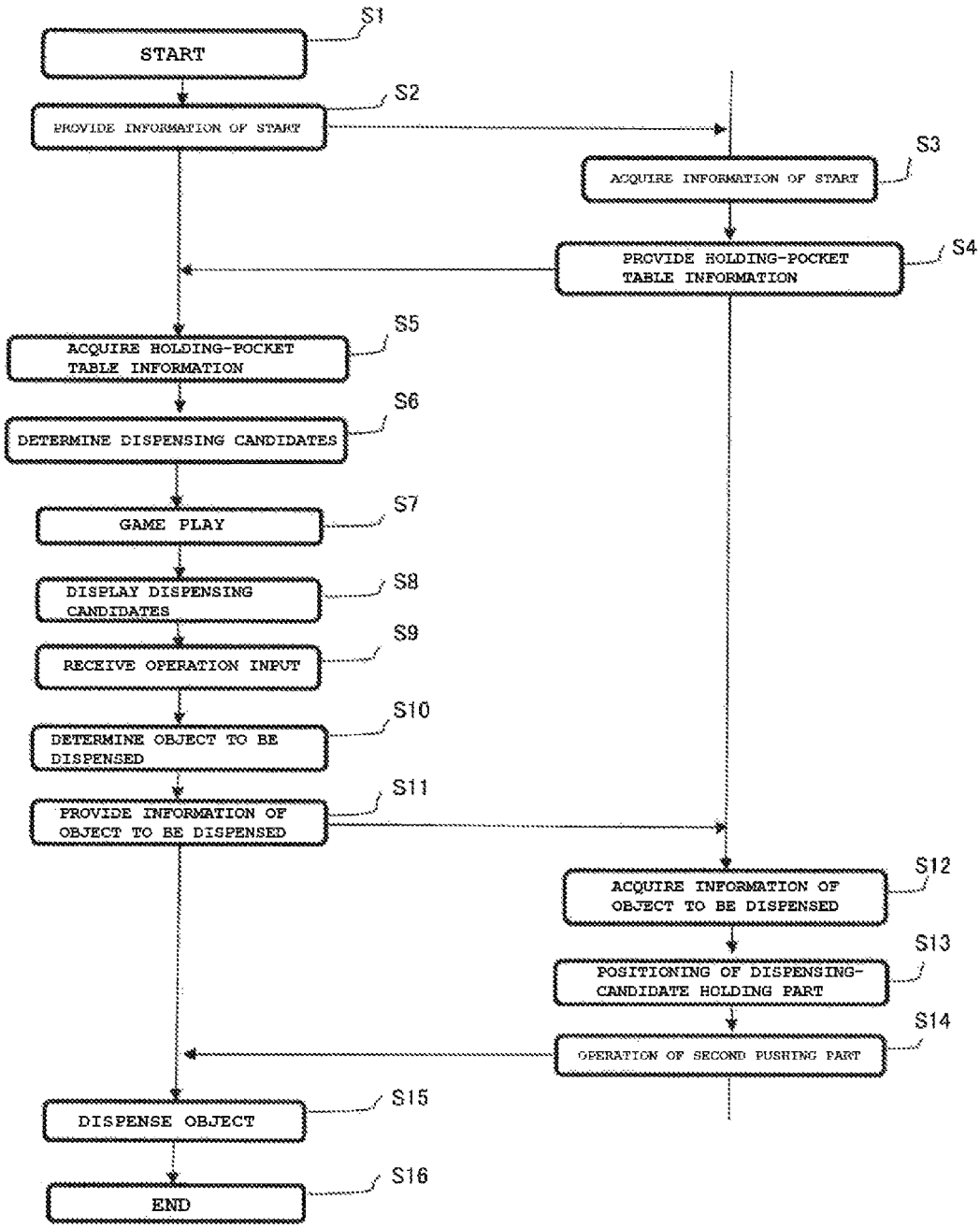
FIG. 11 is a flowchart showing an example of processing of the game device according to the first embodiment of the present invention and an example of processing of the dispensing mechanism accompanying the processing of the game device.
Figure 12:
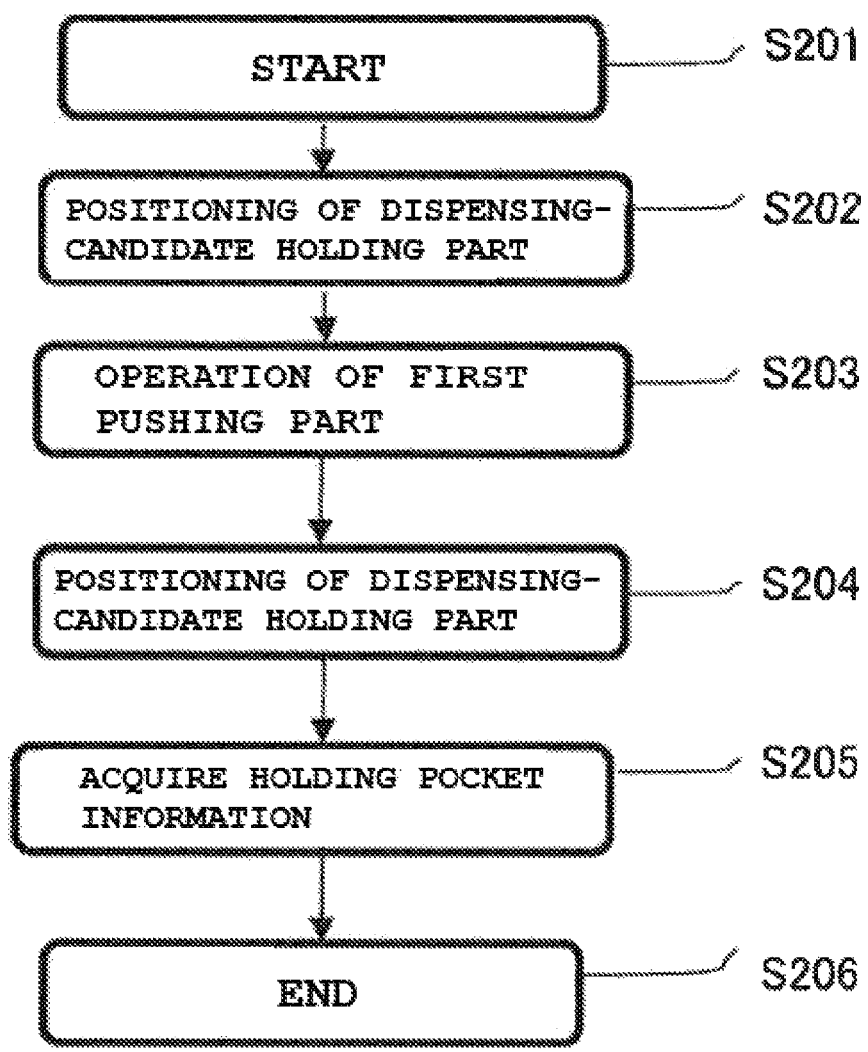
FIG. 12 is a flowchart showing an example of a method for replenishing objects in the dispensing mechanism provided in the game device according to the first embodiment of the present invention.

Next, an example of the operation method for the dispensing mechanism of the present invention will be described. FIG. 10 is a flowchart showing an example of a method for dispensing objects in the dispensing mechanism provided in the game device according to the first embodiment of the present invention. FIG. 11 is a flowchart showing an example of processing of the game device according to the first embodiment of the present invention and an example of processing of the dispensing mechanism accompanying the processing of the game device. FIG. 12 is a flowchart showing an example of a method for replenishing objects in the dispensing mechanism provided in the game device according to the first embodiment of the present invention.

Method for Dispensing Objects

With reference to FIG. 10, descriptions will be made for an example of control to arrange the objects 100, which are stored in the first and second stockers 121 of the accommodating part 12, in the 1st to 16th holding pockets 132*a* of the dispensing-candidate holding part 13 which is a state (initial state) where the objects 100 are not arranged at all.

In the initial state, the arrangement of the objects 100 is started (S100). Then, the operation control part 183 rotates the dispensing-candidate holding part 13 (S101). At this time, the detection part 16 detects the position information of the 1st to 16th holding pockets 132a (S102). Specifically, the detection part 16 detects the position information (index information) of the reference holding pocket 132a by the first sensor 161 and detects the position information (position with respect to the index) of each holding pocket 132a in order from the reference holding pocket 132a by the second sensor 162. Thus, the information acquisition part 181 can acquire the position information of the 1st to 16th holding pockets 132a. The detected position information is stored in the second storage part 19.

After detecting the position information of the 1st to 16th holding pockets 132a, the operation control part 183 stops the rotation of the dispensing-candidate holding part 13 (S103). After that, the operation control part 183 controls the operation of the dispensing-candidate holding part 13, so that a predetermined holding pocket 132a (for example, the 1st holding pocket 132a) is positioned so as to face a predetermined stocker 121 (for example, the first stocker 121 located in 9 o'clock direction in FIG. 7) (S104). At this time, the predetermined holding pocket 132a (9th holding pocket 132a) is also positioned with respect to the second stocker 121 located in 3 o'clock direction in FIG. 7. Namely, the operation control part 183 controls the operation of the dispensing-candidate holding part 13, so that the two predetermined holding pockets 132a are positioned so as to face the first and second stockers 121, respectively.

In the state where the 1st and 9th holding pockets 132a are respectively facing the first and second stockers 121, the operation control part 183 controls the operation of the first pushing part 141 (S105). Thereby, the first pushing part 141 linearly moves so as to alternately push each object 100 of the first stocker 121 and each object 100 of the second stocker 121. In other words, the operation control part 183 controls the operation of the first pushing part 141 such that the first pushing part 141 moves linearly between the pair of accommodating parts 12 (S105).

As a result, the object 100 accommodated at the bottom of the first stocker 121 (the object 100 in contact with the mounting surface of the mounting part 11) is pushed by the first pushing part 141 so as to be held in the 1st holding pocket 132a. At this time, the first pushing part 141 may temporarily maintain a state where the object 100 has been pushed, that is, a state where the first pushing part 141 has been positioned below the first stocker 121.

Subsequently, the first pushing part 141 linearly moves so as to push the object 100 accommodated at the bottom of the second stocker 121. Specifically, since the 9th holding pocket 132a is in the state of facing the second stocker 121, the first pushing part 141 linearly moves toward the 9th holding pocket 132a. As a result, the object 100 accommodated at the bottom of the second stocker 121 is pushed by the first pushing part 141 so as to be held in the 9th holding pocket 132a. The first pushing part 141 maintains a state where the object 100 has been pushed, that is, a state where the first pushing part 141 has been positioned below the second stocker 121.

Steps 104 to 105 are repeated until the objects 100 are arranged in all the holding pockets 132a of the dispensing-candidate holding part 13 (S106). After the objects 100 have been arranged in all the holding pockets 132a (Yes in S106), the process proceeds to step 107. Namely, following the arrangement of the objects 100 in the dispensing-candidate holding part 13, the operation control part 183 controls the operation of the dispensing-candidate holding part 13, so that the predetermined holding pocket 132a is positioned below the imaging part 15 (S107). Then, the camera 151 of the imaging part 15 takes an image of the two-dimensional code 101 of the object 100 placed in the predetermined holding pocket 132a. Thus, the information acquisition part 181 acquires information that the object 100 is placed in the predetermined holding pocket 132a and information regarding the type of this object 100 (hereinafter, both information altogether is referred to as "holding pocket information") (S108).

Steps 107 to 108 are repeated until the holding pocket information for all the holding pockets 132a is acquired (S109). Specifically, the operation control part 183 controls the operation of the dispensing-candidate holding part 13, so that the 1st holding pocket 132a is positioned below the imaging part 15 (S107). Then, the camera 151 of the imaging part 15 takes an image of the two-dimensional code 101 of the object 100 placed in the 1st holding pocket 132a. In this way, when steps 107 to 108 are repeated to acquire the holding pocket information for all the holding pockets 132a of the dispensing-candidate holding part 13, that is, the 1st to 16th holding pockets 132a (Yes at the step 109), the arrangement of the objects 100 is completed (S110).

As described above, the operation control part 183 can independently control the operation of each of the dispensing-candidate holding part 13 and the first pushing part 141. This makes it possible to smoothly arrange the objects 100 in the dispensing-candidate holding part 13. In the present embodiment, the dispensing-candidate holding part 13 is provided around the mounting part 11. For this reason, the dispensing-candidate holding part 13 can rotate with a center as the mounting part 11. Thus, a predetermined holding pocket 132a among of the holding pockets 132a can be efficiently related to a predetermined stocker 121 among of the stockers 121 which are provided on the mounting part 11. Then, the operation control part 183 controls the operation of the first pushing part 141 to efficiently send the object 100 accommodated at the bottom of the predetermined stocker 121 to the predetermined holding pocket 132a.

At the step 108, when the information acquisition part 181 acquires the first identification information recorded in the pocket identification code 132b, the information acquisition part 181 acquires information (arrangement error information) that the object 100 has not been placed in the holding pocket 132a. The information processing part 182 may process the arrangement error information to temporarily stop the dispensing mechanism 10. When the information acquisition part 181 cannot acquire information of both the two-dimensional code 101 of the object 100 and the pocket identification code 132b of the holding pocket 132a (for example, when a foreign substance is attached to the holding pocket 132a), the information acquisition part 181 can acquire foreign substance information. The information providing part 184 can provide the game control part 8 with the foreign substance information so that the game processing means 82 can interrupt the start of the game.

From the above, the objects 100 have been arranged in the 1st to 16th holding pockets 132a. When the objects 100 accommodated in the stocker 121 include rare objects 100 and normal objects 100 in a predetermined ratio, the objects 100, which have been arranged in the dispensing-candidate holding part 13, include the rare objects 100 and the normal objects 100 according to the ratio. Table 1 below shows an example of information for the 1st to 16th holding pockets 132a in which the objects 100 have been arranged (hereinafter, referred to as "holding-pocket table information"). The holding-pocket table information is acquired by the information acquisition part 181 and stored in the second storage part 19. The information providing part 184 can provide the game control part 8 with the holding-pocket table information stored in the second storage part 19. Accordingly, the acquisition means 81 can acquire the holding-pocket table information, and the game processing means 82 can use the holding-pocket table information for the progress of the game.

TABLE 1

| 1st holding pocket 132a | Normal object 100A |
| 2nd holding pocket 132a | Normal object 100B |
| 3rd holding pocket 132a | Normal object 100C |
| 4th holding pocket 132a | Normal object 100D |
| 5th holding pocket 132a | Normal object 100E |
| 6th holding pocket 132a | Rare object 100A |
| 7th holding pocket 132a | Rare object 100B |
| 8th holding pocket 132a | Rare object 100C |
| 9th holding pocket 132a | Normal object 100F |
| 10th holding pocket 132a | Normal object 100G |
| 11th holding pocket 132a | Normal object 100H |
| 12th holding pocket 132a | Normal object 100I |
| 13th holding pocket 132a | Rare object 100D |
| 14th holding pocket 132a | Rare object 100E |
| 15th holding pocket 132a | Rare object 100F |
| 16th holding pocket 132a | Normal object 100J |

(2) Dispensing-Process Method for Game Play

With reference to FIG. 11, descriptions will be made for an example of control from starting the game play to dispensing the object 100 from the dispensing port 21.

The game control part 8 starts a game along with operation of a player (S1). At this time, the information providing means 85 provides the second control part 18 of the dispensing mechanism 10 with information that the game has started (S2). Thus, the information acquisition part 181 of the dispensing mechanism 10 acquires the information that the game has started (S3). Then, the information providing part 184 provides the game control part 8 with the holding-pocket table information stored in the second storage part 19 (S4), whereby the acquisition means 81 acquires the holding-pocket table information (S5). The acquired holding-pocket table information is temporarily stored in the storage part 7. The information providing part 184 may provide the holding-pocket table information stored in the second storage part 19 to the game control part 8 before the start of the game. Further, at the step 1, the acquisition means 81 may acquire information of the IC card or the predetermined ticket placed on the scanner 42.

Next, the game processing means 82 determines the objects (objects to be dispensed) 100 as the dispensing candidates (S6). In this example, the game processing means 82 determines the three objects 100 as dispensing candidates as shown in Table 2 below. When the acquisition means 81 acquires the information of the IC card placed on the scanner 42, the dispensing candidates may be determined based on the player information.

TABLE 2

| Player |
| --- |
| Rare object 100A |
| (6th holding pocket 132a) |
| Normal object 100I |
| (12th holding pocket 132a) |
| Normal object 100J |
| (16th holding pocket 132a) |

Such information of these determined dispensing candidates is temporarily stored in the storage part 7. Then, the game processing means 82 executes the game program to proceed with the game (S7).

After the game play, the game processing means 82 selects all or a part of the determined dispensing candidates, and the displaying part 6 displays the selected dispensing candidates (S8). In this example, all of the dispensing candidates shown in Table 2 are selected by the game processing means 82.

Next, the operation part 3 receives operation input of the player (S9), so that the player selects the object to be dispensed from among the displayed dispensing candidates. For example, the rare object 100A (the object 100 held in the 6th holding pocket 132a) is selected by the player. Accordingly, the object to be dispensed is determined (S10), and the acquisition means 81 acquires the information of the object to be dispensed. Then, the information providing means 85 provides the second control part 18 with the information of the object to be dispensed (S11).

Then, the information acquisition part 181 acquires the information of the object to be dispensed (S12). The operation control part 183 independently controls the operation of each of the dispensing-candidate holding part 13 and the second pushing part 142 based on the information of the object to be dispensed (S13 to S14). Thus, the second pushing part 142 pushes the rare object 100A from the 6th holding pocket 132a, so that the rare object 100A is dispensed from the game device 1 (S15).

Steps 13 to 15 will be specifically described. First, in order to dispense the rare object 100A selected by the player, the operation control part 183 controls the operation of the dispensing-candidate holding part 13 such that the 6th holding pocket 132a is positioned to face the second pushing part 142 (S13).

In this state, the operation control part 183 controls the operation of the second pushing part 142 (S14). By driving the third motor D3, the second pushing part 142 linearly moves along the rail portion 142c, so that the contact portion 142a of the second pushing part 142 makes a contact with the object 100 held in the 6th holding pocket 132a. Then, the second pushing part 142 pushes the rare object 100A held in the 6th holding pocket 132a. As a result, the rare object 100A is sent to the gate part 17. After that, the rare object 100A moves to the dispensing port 21 due to its own weight and is dispensed (S15). By driving the third motor D3 for the opposite direction, the second pushing part 142 is pulled back along the rail portion 142c. In this way, the second pushing part 142 is configured to move linearly. Thus, the second pushing part 142 can efficiently dispense the object 100.

In this way, the operation control part 183 independently controls the operation of each of the dispensing-candidate holding part 13 and the second pushing part 142, so that the object 100 can be smoothly dispensed from the dispensing-candidate holding part 13. In the present embodiment, the dispensing-candidate holding part 13 is provided around the mounting part 11. For this reason, the dispensing-candidate holding part 13 can rotate with a center as the mounting part 11. Thus, the predetermined holding pockets 132a among of the holding pockets 132a can be efficiently related to the second pushing part 142 which is provided on the mounting part 11. Therefore, the predetermined object 100 can be efficiently dispensed from among the objects 100 held in the dispensing-candidate holding part 13.

As described above, the dispensing-candidate holding part 13 can efficiently operate with respect to the plurality of stockers 121 and the second pushing part 142. From such a viewpoint, it is preferable that the mounting part 11 and the dispensing-candidate holding part 13 are provided so as to be adjacent to each other. This makes it possible to efficiently position each holding pocket 132a of the dispensing-candidate holding part 13 with respect to each part mounted on the mounting part 11 by the operation control part 183. As a result, the dispensing mechanism 10 can efficiently dispense the object 100.

With the above-mentioned control, it is possible to dispense the rare object 100A selected by the player. After that, the game ends (S16). Depending on the content of the game, the player may be able to select a plurality of objects 100. In this case, steps 13 to 15 are repeated.

From the above, the rare object 100A has been dispensed from the 6th holding pocket 132a. For this reason, the 6th holding pocket 132a is in a state (vacant state) in which the object 100 is not placed. In order to confirm this vacant state, the operation control part 183 rotates the dispensing-candidate holding part 13, so that the 6th holding pocket 132a is positioned below the imaging part 15. In this state, the imaging part 15 takes an image of the pocket identification code 132b provided in the 6th holding pocket 132a. As a result, the information acquisition part 181 can acquire information (first identification information) that the 6th holding pocket 132a is in the vacant state. In this way, the information acquisition part 181 can acquire the first identification information of each holding pocket 132a. In addition, the information processing part 182 can manage information that which number of the holding pocket 132a is vacant (hereinafter, referred to as "holding-pocket vacant information"). The holding-pocket vacant information is stored in the second storage part 19. Based on the holding-pocket vacant information, the objects 100 accommodated in the accommodating part 12 can be provided to the dispensing-candidate holding part 13 by the operation control part 183. Thus, the objects 100 can be smoothly replenished to the dispensing-candidate holding part 13.

In this case, the object 100 can be replenished after each game. Hereinafter, an example of the method for replenishing the object 100 will be described with reference to FIG. 12. It should be noted that the replenishing of the object 100 may be appropriately performed not every time after the end of the game, but according to the number of remaining objects 100 held in the dispensing-candidate holding part 13. For example, when the number of objects 100 held in the dispensing-candidate holding part 13 is reduced to half or less (8 or less), the replenishing of the objects 100 may be performed.

(3) Method for Replenishing Objects

Based on the holding-pocket table information and the holding-pocket vacant information stored in the second storage part 19, the operation control part 183 starts the replenishing of the objects 100 (S201).

In this example, a case where the 1st holding pocket 132a is vacant will be described. The process proceeds to step 202, and the operation control part 183 controls the operation of the dispensing-candidate holding part 13. Thereby, the 1st holding pocket 132a is positioned so as to face the first stocker 121. Next, the operation control part 183 controls the operation of the first pushing part 141 (S203). Thereby, an object 100 accommodated at the bottom of the first stocker 121 is pushed by the first pushing part 141 and then is placed in the vacant 1st holding pocket 132a.

After the new object 100 is placed in the 1st holding pocket 132a, the operation control part 183 controls the operation of the dispensing-candidate holding part 13 to position the 1st holding pocket 132a below the imaging part 15 (S204). Then, the camera 151 of the imaging part 15 takes an image of the two-dimensional code 101 of the new object 100 placed in the 1st holding pocket 132a. Thus, the information acquisition part 181 acquires the holding pocket information regarding the object 100 newly placed in the 1st holding pocket 132a (S205).

In this example, by placing the new object 100 in the 1st holding pocket 132a, all the holding pockets 132a are provided with the objects 100. For this reason, the replenishment is completed (S206).

When it is necessary to replenish the plurality of objects 100, the information processing part 182 performs a step of confirming whether or not all the holding pockets 132a of the dispensing-candidate holding part 13 are provided with the objects 100 after step 205 based on the holding-pocket table information and the holding-pocket vacant information. In this case, the replenishment is completed after steps 202 to 205 are repeated until all the holding pockets 132a are provided with the objects 100.

As a result of the above-mentioned replenishment, the information acquisition part 181 can acquire new holding-pocket table information. The new holding-pocket table information is stored in the second storage part 19. Further, the information processing part 182 may be able to update the holding-pocket table information based on the result of the above-mentioned replenishment.

As described above, the above-mentioned methods of processing can be created by a program executed by a computer. Such a program is realized by a CPU (Central Processing Unit), a microprocessor (Micro Processor), a GPU (Graphic Processing Unit), a RAM (Random Access Memory), a ROM (Read Only Memory) and the like.

Second Embodiment

Next, the second embodiment of the dispensing mechanism of the present invention will be described with reference to the attached drawings.

Figure 13:
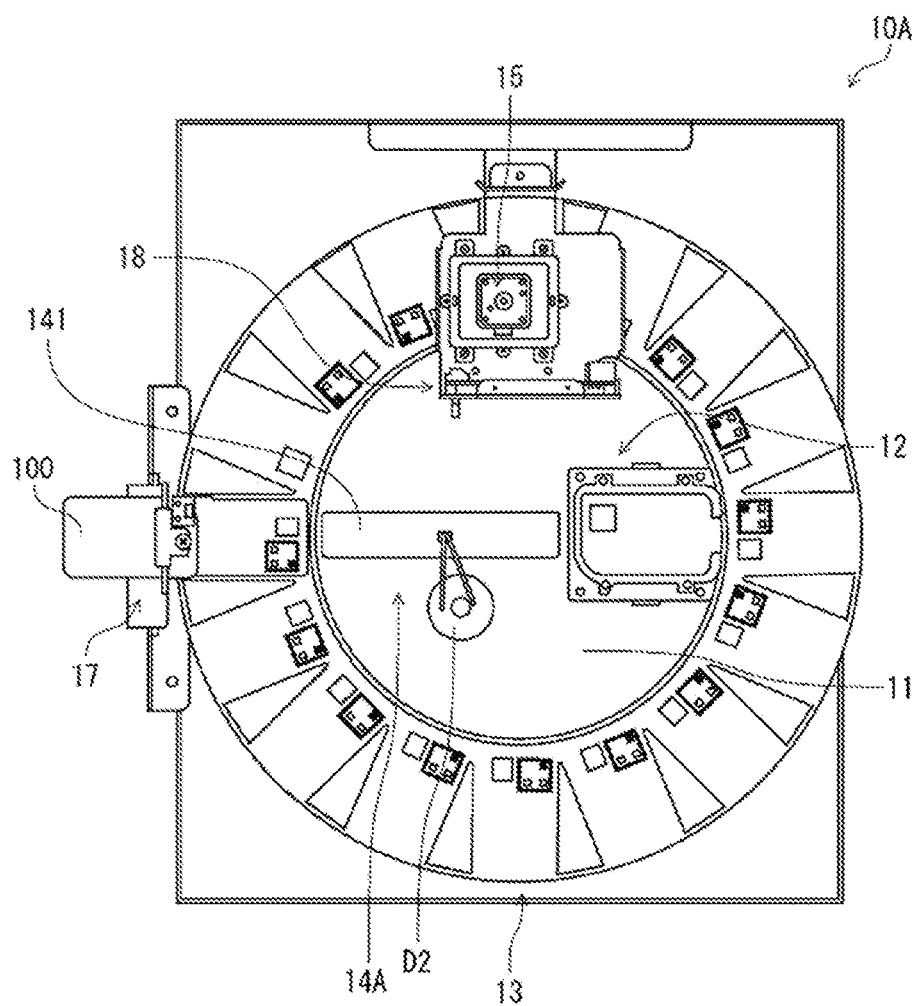
FIG. 13 is a plan view schematically showing a dispensing mechanism according to the second embodiment of the present invention.

FIG. 13 is a plan view schematically showing a dispensing mechanism according to the second embodiment of the present invention. Hereinafter, the second embodiment will be described, but differences from the first embodiment described above will be mainly described, and descriptions of the same matters will be omitted. The same reference numerals are given to the same configurations as those of the first embodiment described above.

The dispensing mechanism 10A of the present embodiment is different from the dispensing mechanism 10 of the first embodiment in terms of the configuration of the pushing mechanism and the arrangement of the gate part. Specifically, the pushing mechanism 14A of the present embodiment is composed of the first pushing part 141. One end portion of the first pushing part 141 (end portion located on the right side in FIG. 13) has a function of pushing each object 100 accommodated in the accommodating part 12 to the dispensing-candidate holding part 13. Further, the other end portion of the first pushing part 141 (end portion located on the left side in FIG. 13) has a function of pushing each object 100 held by the dispensing-candidate holding part 13 to the outside of the dispensing-candidate holding part 13. Along with this, the gate part 17 is placed along the lengthways direction of the first pushing part 141. The dispensing mechanism 10A of the present embodiment also has the same effects as those of the dispensing mechanism 10 of the first embodiment.

Although the game device and the dispensing mechanism of the present invention have been described above based on preferred embodiments, the present invention is not limited to these embodiments. The configuration of each part can be modified or replaced with any configuration having the same function. Further, any other means or constituents may be added to the present invention. Furthermore, in the present invention, any two or more configurations (features) of each embodiment may be combined.

For example, each part may be provided with a cover member. Further, the configuration of each part is not particularly limited as long as each function can be appropriately exhibited. For example, each part can be formed of a hard resin material, a metal material, a ceramic material or the like.

INDUSTRIAL APPLICABILITY

The dispensing mechanism of the present invention is configured to dispense objects in connection with a game, and includes an accommodating part for accommodating the objects; a dispensing-candidate holding part for holding the objects as dispensing candidates; a pushing mechanism for pushing each of the objects accommodated in the accommodating part to the dispensing-candidate holding part; and a control part for controlling operation of the pushing mechanism. This makes it possible to provide the dispensing mechanism that can be easily maintained and has versatility, and provide the game device including such a dispensing mechanism. Therefore, the present invention has industrial applicability.

EXPLANATION OF REFERENCE NUMERAL

1: Game device
2: Housing
3: Operation part
4: Reading part
6: Displaying part
7: Storage part
8: Game control part
9: Communication part
10: Dispensing mechanism
10A: Dispensing Mechanism
11: Mounting part
12: Accommodating part
13: Dispensing-candidate holding part
14: Pushing mechanism
14A: Pushing mechanism
15: Imaging part
16: Detection part
17: Gate part
18: Second control part
19: Second storage part
20: Pedestal part
21: Dispensing port
22: Coin insertion port
23: Coin return port
31: Push button
32: Lever
41: Slot
42: Scanner
81: Acquisition means
82: Game processing means
83: Displaying control means
84: Sound output control means
85: Information providing means
100: Object (recording medium)
101: two-dimensional code
121: First stocker
121: Second stocker
122: Main body portion
122a: Beam portion
122c: Notch portion
123: Intermediate portion
124: Foot portion
131: Support portion
132: Arrangement portion
132a: Holding pocket
132b: Pocket identification code
132c: Number entry field
141: First pushing part
141a: Support portion
142: Second pushing part
142a: Contact portion
142b: Receiving portion
142c: Rail portion
151: Camera
161: First sensor
162: Second sensor
163: Third sensor
171: Flap
172: Dispensing path
181: Information acquisition part
182: Information processing part
183: Operation control part
184: Information providing part
D1: First motor
D1a: First gear
D2: Second motor
D2a: Second gear
D3: Third motor
D3a: Third gear

The invention claimed is:

1. A dispensing mechanism for dispensing objects in connection with a game and used in a game device having a game control part, the mechanism comprising:
an accommodating part for accommodating the objects;
a dispensing-candidate holding part for holding the objects as dispensing candidates;
a pushing mechanism for pushing each of the objects accommodated in the accommodating part to the dispensing-candidate holding part;
a control part for controlling operation of the pushing mechanism; and
an imaging part provided above the dispensing-candidate holding part,
wherein the control part is different from the game control part for controlling progress of the game,
wherein the dispensing-candidate holding part has first identification information, and
wherein the imaging part is configured to read the first identification information of the dispensing-candidate holding part.

2. The mechanism according to claim 1, wherein the control part controls providing of the object from the accommodating part to the dispensing-candidate holding part based on the first identification information read by the imaging part.

3. The mechanism according to claim 1, wherein each of the objects has second identification information, and
wherein the control part determines the object to be dispensed based on the second identification information read by the imaging part.

4. The mechanism according to claim 1, wherein the control part further controls operation of the dispensing-candidate holding part, and independently controls the operation of each of the pushing mechanism and the dispensing-candidate holding part.

5. A game device comprising:
- a displaying part for displaying a predetermined image related to a game;
- a game control part for controlling progress of the game;
- an operation part for receiving operation input from a user in order to proceed with the game; and
- the dispensing mechanism according to any one of claim 1 for dispensing objects in connection with the game based on the operation input.

6. A dispensing mechanism for dispensing objects in connection with a game and used in a game device having a game control part, the mechanism comprising:
- an accommodating part for accommodating the objects;
- a dispensing-candidate holding part for holding the objects as dispensing candidates;
- a pushing mechanism for pushing each of the objects accommodated in the accommodating part to the dispensing-candidate holding part; and
- a control part for controlling operation of the pushing mechanism,
- wherein the control part is different from the game control part for controlling progress of the game,
- wherein the dispensing-candidate holding part is formed into an annular shape, and wherein the pushing mechanism is provided inside the dispensing-candidate holding part.

7. A dispensing mechanism for dispensing objects in connection with a game and used in a game device having a game control part, the mechanism comprising:
- an accommodating part for accommodating the objects;
- a dispensing-candidate holding part for holding the objects as dispensing candidates;
- a pushing mechanism for pushing each of the objects accommodated in the accommodating part to the dispensing-candidate holding part; and
- a control part for controlling operation of the pushing mechanism,
- wherein the control part is different from the game control part for controlling progress of the game, and
- wherein the pushing mechanism includes a first pushing part for pushing each of the objects accommodated in the accommodating part to the dispensing-candidate holding part, and a second pushing part for pushing each of the objects held by the dispensing-candidate holding part to the outside of the dispensing-candidate holding part.

8. The mechanism according to claim 7, wherein a portion of the second pushing part overlaps with the first pushing part.

9. The mechanism according to claim 7, wherein the first pushing part is formed into a plate shape,
- wherein the second pushing part is formed into an elongated shape, and
- wherein a lengthways direction of the first pushing part and a lengthways direction of the second pushing part are orthogonal to each other.

10. The mechanism according to claim 7, wherein each of the first pushing part and the second pushing part moves linearly.

11. The mechanism according to claim 7, wherein a tip portion of the second pushing part is located on the same plane as the first pushing part and is configured to dispense the object.

12. A dispensing mechanism for dispensing objects in connection with a game and used in a game device having a game control part, the mechanism comprising:
- an accommodating part for accommodating the objects;
- a dispensing-candidate holding part for holding the objects as dispensing candidates;
- a pushing mechanism for pushing each of the objects accommodated in the accommodating part to the dispensing-candidate holding part; and
- a control part for controlling operation of the pushing mechanism,
- wherein the control part is different from the game control part for controlling progress of the game,
- wherein the accommodating part includes a pair of accommodating parts, and
- wherein the pair of accommodating parts are provided inside the dispensing-candidate holding part.

13. The mechanism according to claim 12, wherein a portion of the pushing mechanism is located below at least one of the pair of accommodating parts.

* * * * *